(12) United States Patent
Okuda et al.

(10) Patent No.: US 7,996,139 B2
(45) Date of Patent: Aug. 9, 2011

(54) MOTOR VEHICLE AND CONTROL METHOD OF MOTOR VEHICLE

(75) Inventors: Koichi Okuda, Susono (JP); Mitsuhiro Tabata, Sunto-gun (JP); Hiroshi Sato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 347 days.

(21) Appl. No.: 11/658,504

(22) PCT Filed: May 31, 2006

(86) PCT No.: PCT/JP2006/311354
§ 371 (c)(1),
(2), (4) Date: Jan. 25, 2007

(87) PCT Pub. No.: WO2006/129852
PCT Pub. Date: Dec. 7, 2006

(65) Prior Publication Data
US 2008/0154472 A1  Jun. 26, 2008

(30) Foreign Application Priority Data

Jun. 1, 2005 (JP) .................. 2005-161612
Aug. 25, 2005 (JP) .................. 2005-244262

(51) Int. Cl.
*G06F 7/00* (2006.01)
(52) U.S. Cl. ............... 701/93; 701/51; 701/54; 701/65; 701/70; 701/79; 701/84; 701/85; 701/94; 701/101; 180/197; 477/169; 477/173; 477/174; 477/108; 477/90

(58) Field of Classification Search .................... 701/50, 701/51, 54, 64, 70, 79, 84, 85, 93, 94, 101; 180/170, 197; 477/169, 173, 174, 108, 90, 477/91, 110
See application file for complete search history.

(56) References Cited

U.S. PATENT DOCUMENTS

| | | | | |
|---|---|---|---|---|
| 5,010,974 | A | * | 4/1991 | Matsuda ................ 180/233 |
| 5,041,978 | A | * | 8/1991 | Nakayama et al. ........... 701/84 |
| 5,184,527 | A | | 2/1993 | Nakamura |
| 5,287,773 | A | * | 2/1994 | Nakawaki et al. ........... 477/92 |

(Continued)

FOREIGN PATENT DOCUMENTS

EP  0581 558 A1  2/1994

(Continued)

*Primary Examiner* — Mark Hellner
*Assistant Examiner* — Redhwan Mawari
(74) *Attorney, Agent, or Firm* — Oliff & Berridge, PLC

(57) ABSTRACT

During a starting operation or a low-speed drive of a vehicle on a slope, the drive control of the invention sets a gradient-corresponding rotation speed $N\theta$ as a rotation speed of an engine to output a required driving force against a longitudinal vehicle gradient $\theta fr$ (step S110), and sequentially sets a low-$\mu$-road correction rotation speed Nlow upon identification of a low-$\mu$-road drive condition, a vehicle speed difference-compensating rotation speed Nv based on a vehicle speed V, and a brake-based correction rotation speed Nb based on a brake pressure Pb (steps S120 through S250). The drive control sets a target engine rotation speed Ne* based on these settings (step S260) and subsequently sets a target throttle opening THtag (step S270). The operation of the engine is controlled with the greater between the target throttle opening THtag and a required throttle opening THreq corresponding to an accelerator opening Acc (step S290). This arrangement effectively prevents an unexpected slide-down of the vehicle along the slope.

24 Claims, 9 Drawing Sheets

U.S. PATENT DOCUMENTS

| | | | |
|---|---|---|---|
| 5,343,780 A | | 9/1994 | McDaniel et al. |
| 5,701,247 A | * | 12/1997 | Sasaki ............................... 701/1 |
| 6,098,007 A | | 8/2000 | Fritz |
| 6,405,115 B2 | * | 6/2002 | Taniguchi et al. ............... 701/51 |
| 2002/0028729 A1 | * | 3/2002 | Kobayashi et al. ........... 477/174 |
| 2004/0040765 A1 | | 3/2004 | Satou et al. |
| 2004/0231951 A1 | * | 11/2004 | Hasegawa et al. ............ 192/220 |

FOREIGN PATENT DOCUMENTS

| | | |
|---|---|---|
| JP | A-63-12839 | 1/1988 |
| JP | A-2-70937 | 3/1990 |
| JP | A 7-322404 | 12/1995 |
| JP | A-9-207622 | 8/1997 |
| JP | A 9-242579 | 9/1997 |
| JP | A 9-280083 | 10/1997 |
| JP | A 10-166897 | 6/1998 |
| JP | A-11-91411 | 4/1999 |
| JP | A-2002-30952 | 1/2002 |
| JP | A 2002-89314 | 3/2002 |
| JP | A-2004-90679 | 3/2004 |
| JP | A-2005-54660 | 3/2005 |

* cited by examiner

MOTOR VEHICLE AND CONTROL METHOD OF MOTOR VEHICLE

TECHNICAL FIELD

The present invention relates to a motor vehicle and its control method.

BACKGROUND ART

One proposed technique applied to a motor vehicle feedback controls the intake air flow of an internal combustion engine for output of a driving power to set the idling state in a drivable gearshift position and to attain a target creep vehicle speed under the condition of both an accelerator-off position and a brake-off position (see, for example, Japanese Patent Laid-Open Gazette No. H10-166897). This prior art motor vehicle is supposed not to slide down along a slope under the brake-off condition on a hill start.

DISCLOSURE OF THE INVENTION

This prior art motor vehicle does not perform the feedback control of the intake air flow to attain the target creep vehicle speed in an accelerator-on position or in a brake-on position. When the driver's depression amount of an accelerator pedal or a brake pedal is insufficient against a certain road gradient, this motor vehicle may fail to output a sufficient driving force or a sufficient braking force against the road gradient and may slide down along the slope. Output of the driving force to attain the target creep vehicle speed during a hill drive on the road surface of a small friction coefficient may cause a slip of the vehicle.

The motor vehicle of the invention and the control method of the motor vehicle aim to prevent an expected slide-down of the vehicle along a slope during a hill start or during a hill drive. The motor vehicle of the invention and the control method of the motor vehicle also aim to ensure a smooth hill start or a smooth hill drive. The motor vehicle of the invention and the control method of the motor vehicle further aim to prevent a potential slip during a hill start or during a hill drive.

In order to attain at least part of the above and the other related objects, a motor vehicle and its control method have the configurations discussed below.

The present invention is directed to a motor vehicle. The motor vehicle includes: an internal combustion engine that has an output shaft and is capable of outputting a driving force for driving the motor vehicle; a driving force transmission mechanism that is linked to the output shaft of the internal combustion engine and to an axle and, in at least a predetermined low vehicle speed range, transmits a driving force corresponding to a rotation speed of the internal combustion engine to the axle; a driving force demand detection unit that detects a driving force demand corresponding to a driver's operation; a road gradient detection unit that detects a road gradient; and a vehicle speed measurement unit that measures a vehicle speed. The motor vehicle further includes a low-speed drive control module that, when the measured vehicle speed is not higher than a preset reference vehicle speed included in the predetermined low vehicle speed range and when the detected road gradient is not less than a preset reference gradient, sets a target rotation speed of the internal combustion engine corresponding to a driving force required for constant-speed driving of the motor vehicle at a target vehicle speed, which is set to be not higher than the preset reference vehicle speed, and sets a target throttle opening for driving the internal combustion engine at the set target rotation speed, when a required throttle opening corresponding to the detected driving force demand is not less than the target throttle opening, the low-speed drive control module controlling operation of the internal combustion engine with the required throttle opening, when the required throttle opening is less than the target throttle opening, the low-speed drive control module controlling the operation of the internal combustion engine with the target throttle opening.

When the measured vehicle speed is not higher than the preset reference vehicle speed and when the detected road gradient is not less than the preset reference gradient, the first motor vehicle of the invention sets the target rotation speed of the internal combustion engine corresponding to the driving force required for constant-speed driving of the motor vehicle at the target vehicle speed, which is set to be not higher than the preset reference vehicle speed, and sets the target throttle opening for driving the internal combustion engine at the set target rotation speed. When the required throttle opening corresponding to the driving force demand in response to the driver's operation is not less than the target throttle opening, the operation of the internal combustion engine is controlled with the required throttle opening. When the required throttle opening is less than the target throttle opening, the operation of the internal combustion engine is controlled with the target throttle opening. Namely the operation of the internal combustion engine is controlled with the greater between the target throttle opening for constant-speed driving of the motor vehicle at the target vehicle speed and the required throttle opening corresponding to the driver's driving force demand. This arrangement effectively prevents an unexpected slide-down of the vehicle along the road gradient, regardless of the driver's operation and the operation amount and ensures a smooth hill start and a smooth hill drive. The driving force demand includes a braking force demand, for example, in response to the driver's depression of a brake pedal, as well as a normal driving force demand in a vehicle-running direction, for example, in response to the driver's depression of an accelerator pedal.

In one preferable application of the first motor vehicle of the invention, the low-speed drive control module sets a vehicle speed difference-compensating rotation speed corresponding to a vehicle speed difference between the measured vehicle speed and the target vehicle speed, and sets the target rotation speed based on the vehicle speed difference-compensating rotation speed. This arrangement sets the target rotation speed according to the vehicle speed and thus enables the motor vehicle to run at the target vehicle speed. The low-speed drive control module may set the vehicle speed difference-compensating rotation speed to cancel out the vehicle speed difference.

In one structure of the first motor vehicle of this preferable application, the low-speed drive control module uses at least part of the detected driving force demand, the detected road gradient, and the measured vehicle speed to specify presence or absence of a bump on a road surface, and upon specification of the presence of a bump, sets the target rotation speed without using the vehicle speed difference-compensating rotation speed. In this structure, the operation of the internal combustion engine is controlled with the target rotation speed, which is set according to the presence or the absence of a bump on the road surface. One typical example of the bump on the road surface is a barrier curb. The low-speed drive control module may specify the presence of a bump, when the detected driving force demand is neither an acceleration demand nor a deceleration demand and when an absolute value of acceleration-deceleration, which is obtained by eliminating an effect of the detected road gradient from a vehicle acceleration, is not less than a preset reference value. The low-speed drive control module may specify the presence of a bump, when the measured vehicle speed is practically equal to 0 and when a rotation speed of the internal combustion engine is not lower than a preset reference rotation speed.

In another preferable application of the first motor vehicle of the invention, when the detected driving force demand is a brake demand, the low-speed drive control module sets a brake-based correction rotation speed corresponding to the brake demand, and sets the target rotation speed based on the brake-based correction rotation speed. This arrangement enables setting of an adequate target rotation speed and ensures output of a suitable driving force from the internal combustion engine in response to a brake demand. The low-speed drive control module may set the brake-based correction rotation speed to increase a reduction degree of the target rotation speed with an increase in level of the brake demand.

In one structure of the first motor vehicle of this preferable application, the low-speed drive control module identifies a vehicle-start condition to start the motor vehicle in a stop state, based on the detected driving force demand and the measured vehicle speed. Upon no identification of the vehicle-start condition, the low-speed drive control module sets the brake-based correction rotation speed according to a first relation against the brake demand. Upon identification of the vehicle-start condition, the low-speed drive control module sets the brake-based correction rotation speed according to a second relation, which sets a lower rotation speed against the brake demand than a rotation speed set in the first relation. This arrangement enables setting of an adequate target rotation speed according to the identification result of the vehicle-start condition and thus ensures output of a suitable driving force from the internal combustion engine. In one preferable embodiment of this structure, the low-speed drive control module identifies the vehicle-start condition when the measured vehicle speed is practically equal to 0 and when the detected driving force demand is a brake demand of not less than a preset reference brake demand. When the measured vehicle speed reaches the preset reference vehicle speed after identification of the vehicle-start condition, the low-speed drive control module cancels the identification of the vehicle-start condition. In another preferable embodiment of this structure, the low-speed drive control module identifies a low friction-road drive condition where a friction coefficient of a road surface is not higher than a predetermined level, based on a specific identification condition. Upon identification of the low friction-road drive condition, the low-speed drive control module sets the brake-based correction rotation speed according to a third relation, which sets a lower rotation speed against a certain brake demand than a rotation speed set in the second relation. This arrangement enables setting of an adequate target rotation speed and ensures output of a suitable driving force from the internal combustion engine under the low friction-road drive condition, thus effectively preventing a potential slip of the motor vehicle.

In still another preferable application of the first motor vehicle of the invention, the low-speed drive control module identifies a low friction-road drive condition where a friction coefficient of a road surface is not higher than a predetermined level, based on a specific identification condition. Upon identification of the low friction-road drive condition, the low-speed drive control module makes a correction to decrease the target rotation speed. This arrangement effectively prevents a potential slip of the motor vehicle.

In one structure of this preferable application, the first motor vehicle further includes a low friction-road drive condition setting unit that sets the low friction-road drive condition in response to the driver's operation. The low-speed drive control module identifies the low friction-road drive condition, based on the setting of the low friction-road drive condition by the low friction-road drive condition setting unit as the specific identification condition. The driver's intention is thus reflected on setting of the specific identification condition.

In another structure of this preferable application, the first motor vehicle further includes a wheel speed measurement unit that measures a wheel speed. The low-speed drive control module computes a slip ratio from the measured wheel speed and identifies the low friction-road drive condition based on the computed slip ratio. In one embodiment of this structure, the low-speed drive control module identifies the low friction-road drive condition when the computed slip ratio is greater than a preset target slip ratio. In one preferable application of this embodiment, the low-speed drive control module sets the target slip ratio to decrease with an increase in detected road gradient and uses the target slip ratio for identification of the low friction-road drive condition. This arrangement identifies the low friction-road drive condition according to the road gradient.

In another preferable application of this embodiment, the first motor vehicle further includes a lateral gradient detection unit that detects a lateral gradient of the motor vehicle. The low-speed drive control module sets the target slip ratio to decrease with an increase in detected lateral gradient and uses the target slip ratio for identification of the low friction-road drive condition. This arrangement effectively prevents a potential slip of the vehicle in the lateral direction.

In still another preferable application of this embodiment, the low-speed drive control module sets a slip-adjustment rotation speed, which gives a greater degree of reduction as a correction of the target rotation speed with an increase in computed slip ratio over the target slip ratio, and sets the target rotation speed based on the slip-adjustment rotation speed.

In still another structure of the preferable application for identifying the low friction-road drive condition, the first motor vehicle further includes a motor that is capable of outputting a driving force to a different axle other than one axle that receives the driving force output from the internal combustion engine. When the target rotation speed is adjusted to have a reduction, the low-speed drive control module controls the motor to output a driving force corresponding to the reduction. The motor outputs the driving force corresponding to the reduction of the target rotation speed. This arrangement thus ensures a smooth hill start or a smooth hill drive of the vehicle on the road surface under the low friction-road drive condition.

In one preferable embodiment of the invention, the first motor vehicle further includes: a motor that is capable of outputting a driving force to one axle that receives the driving force output from the internal combustion engine or a different axle other than the one axle; and a rotation speed measurement unit that measures a rotation speed of the internal combustion engine. When the internal combustion engine is driven with at least the target throttle opening, the low-speed drive control module controls the motor to output a driving force corresponding to a rotation speed difference between the target rotation speed and the measured rotation speed. When a delayed response of the internal combustion engine causes insufficient output of the required driving force from the internal combustion engine, the motor compensates for the insufficiency of the driving force. This arrangement thus prevents an unexpected slide-down of the vehicle during a hill start or during a hill drive and ensures a smooth hill drive. In one structure of this embodiment, when the internal combustion engine is driven with the required throttle opening, the low-speed drive control module controls the motor to output a driving force corresponding to a rotation speed difference between the measured rotation speed and an expected rotation speed in a stationary operation of the internal combustion engine with the required throttle opening.

In another preferable embodiment of the invention, the first motor vehicle further includes a running direction setting unit that sets a running direction of the motor vehicle in response to the driver's operation. When the running direction set by the running direction setting unit is a forward direction, the low-speed drive control module sets the target rotation speed according to a first relation against the road gradient. When the running direction set by the running direction setting unit is a reverse direction, the low-speed drive control module sets the target rotation speed according to a second relation, which sets a lower rotation speed against the road gradient than a rotation speed set in the first relation. In this embodiment, the target rotation speed is set according to the running direction of the vehicle. The lower target rotation speed is set against the road gradient during a drive of the vehicle in the reverse direction than the target rotation speed set during a drive of the vehicle in the forward direction. This arrangement effectively protects the driver from the potential anxiety, uneasiness, and uncomfortable feeling caused by the acceleration in the reverse direction, which is opposite to the normal driving direction. In one structure of this preferable embodiment, the first motor vehicle further includes a target vehicle speed setting unit that sets a first vehicle speed to the target vehicle speed when the running direction set by the running direction setting unit is a forward direction, and sets a second vehicle speed, which is lower than the first vehicle speed, to the target vehicle speed when the running direction set by the running direction setting unit is a reverse direction. This arrangement more effectively protects the driver from the potential anxiety, uneasiness, and uncomfortable feeling caused by the acceleration in the reverse direction, which is opposite to the normal driving direction.

The present invention is also directed to a second motor vehicle. The motor vehicle includes: an internal combustion engine that has an output shaft and is capable of outputting a driving force for driving the motor vehicle; a driving force transmission mechanism that is linked to the output shaft of the internal combustion engine and to an axle and, in at least a predetermined low vehicle speed range, transmits a driving force corresponding to a rotation speed of the internal combustion engine to the axle; a driving force demand detection unit that detects a driving force demand corresponding to a driver's operation; a road gradient detection unit that detects a road gradient and a vehicle speed measurement unit that measures a vehicle speed. The second motor vehicle further includes a low-speed drive control module that, when the measured vehicle speed is not higher than a preset reference vehicle speed included in the predetermined low vehicle speed range and when the detected road gradient is not less than a preset reference gradient, sets a target throttle opening to make the internal combustion engine output a driving force required for constant-speed driving of the motor vehicle at a target vehicle speed, which is set to be not higher than the preset reference vehicle speed, when a required throttle opening corresponding to the detected driving force demand is not less than the target throttle opening, the low-speed drive control module controlling operation of the internal combustion engine with the required throttle opening, when the required throttle opening is less than the target throttle opening, the low-speed drive control module controlling the operation of the internal combustion engine with the target throttle opening.

When the measured vehicle speed is not higher than the preset reference vehicle speed and when the detected road gradient is not less than the preset reference gradient, the second motor vehicle of the invention sets the target throttle opening to make the internal combustion engine output the driving force required for constant-speed driving of the motor vehicle at the target vehicle speed, which is set to be not higher than the preset reference vehicle speed. When a required throttle opening corresponding to the driving force demand in response to the driver's operation is not less than the target throttle opening, the operation of the internal combustion engine is controlled with the required throttle opening. When the required throttle opening is less than the target throttle opening, the operation of the internal combustion engine is controlled with the target throttle opening. Namely the operation of the internal combustion engine is controlled with the greater between the target throttle opening for constant-speed driving of the motor vehicle at the target vehicle speed and the required throttle opening corresponding to the driver's driving force demand. This arrangement effectively prevents an unexpected slide-down of the vehicle along the road gradient, regardless of the driver's operation and the operation amount and ensures a smooth hill start and a smooth hill drive. The driving force demand includes a braking force demand, for example, in response to the driver's depression of a brake pedal, as well as a normal driving force demand in a vehicle-running direction, for example, in response to the driver's depression of an accelerator pedal.

In one preferable embodiment of the second motor vehicle of the invention, the low-speed drive control module sets the target throttle opening based on a vehicle speed difference between the measured vehicle speed and the target vehicle speed. This arrangement sets the target throttle opening according to the vehicle speed and thus enables the motor vehicle to run at the target vehicle speed.

In another preferable embodiment of the second motor vehicle of the invention, the low-speed drive control module uses at least part of the detected driving force demand, the detected road gradient, and the measured vehicle speed to specify presence or absence of a bump on a road surface, and upon specification of the presence of a bump, sets the target throttle opening based on the specification result. In this structure, the operation of the internal combustion engine is controlled with the target throttle opening, which is set according to the presence or the absence of a bump on the road surface.

In still another preferable embodiment of the invention, when the detected driving force demand is a brake demand, the low-speed drive control module sets the target throttle opening based on the brake demand. This arrangement enables setting of an adequate target throttle opening and ensures output suitable driving force from the internal-combustion engine in response to a brake demand.

In still another preferable embodiment of the second motor vehicle of the invention, the low-speed drive control module identifies a low friction-road drive condition where a friction coefficient of a road surface is not higher than a predetermined level, based on a specific identification condition, upon identification of the low friction-road drive condition, the low-speed drive control module making a correction to reduce the target throttle opening. This arrangement effectively prevents a potential slip of the motor vehicle. The second motor vehicle further includes a motor that is capable of outputting a driving force to a different axle other than one axle that receives the driving force output from the internal combustion engine. When the target throttle opening is adjusted to have a reduction, the low-speed drive control module controls the motor to output a driving force corresponding to the reduction. The motor outputs the driving force corresponding to the reduction of the target throttle opening. This arrangement thus ensures a smooth hill start or a smooth hill drive of the vehicle on the road surface under the low friction-road drive condition.

In still another preferable embodiment of the second motor vehicle of the invention, the motor vehicle further includes: a motor that is capable of outputting a driving force to one axle that receives the driving force output from the internal combustion engine or a different axle other than the one axle; and a rotation speed measurement unit that measures a rotation speed of the internal combustion engine. When the internal combustion engine is driven with at least the target throttle opening, the low-speed drive control module controls the motor to output a driving force corresponding to a rotation speed difference between the measured rotation speed and an expected rotation speed in a stationary operation of the internal combustion engine with the target throttle opening. When a delayed response of the internal combustion engine causes insufficient output of the required driving force from the internal combustion engine, the motor compensates for the insufficiency of the driving force. This arrangement thus prevents an unexpected slide-down of the vehicle during a hill start or during a hill drive and ensures a smooth hill drive.

In still another preferable embodiment of the second motor vehicle of the invention, the motor vehicle further includes a running direction setting unit that sets a running direction of the motor vehicle in response to the driver's operation. When the running direction set by the running direction setting unit is a forward direction, the low-speed drive control module sets the target throttle opening according to a first relation against the road gradient. When the running direction set by the running direction setting unit is a reverse direction, the low-speed drive control module sets the target throttle opening according to a second relation, which sets a smaller throttle opening against the road gradient than a throttle opening set in the first relation. In this embodiment, the target throttle opening is set according to the running direction of the vehicle. The lower target rotation speed is set against the road gradient during a drive of the vehicle in the reverse direction than the target throttle opening set during a drive of the vehicle in the forward direction. This arrangement effectively protects the driver from the potential anxiety, uneasiness, and uncomfortable feeling caused by the acceleration in the reverse direction, which is opposite to the normal driving direction. In another preferable embodiment, the second motor vehicle further includes a target vehicle speed setting unit that sets a first vehicle speed to the target vehicle speed when the running direction set by the running direction setting unit is a forward direction, and sets a second vehicle speed, which is lower than the first vehicle speed, to the target vehicle speed when the running direction set by the running direction setting unit is a reverse direction. This arrangement more effectively protects the driver from the potential anxiety, uneasiness, and uncomfortable feeling caused by the acceleration in the reverse direction, which is opposite to the normal driving direction.

The present invention is also directed to a third motor vehicle. The motor vehicle includes: an internal combustion engine that has an output shaft and is capable of outputting a driving force for driving the motor vehicle; a driving force transmission mechanism that is linked to the output shaft of the internal combustion engine and to an axle and, in at least a predetermined low vehicle speed range, transmits a driving force corresponding to a rotation speed of the internal combustion engine to the axle; a driving force demand detection unit that detects a driving force demand corresponding to a driver's operation; a road gradient detection unit that detects a road gradient and a vehicle speed measurement unit that measures a vehicle speed. The third motor vehicle further includes a low-speed drive control module that, when the measured vehicle speed is not higher than a preset reference vehicle speed included in the predetermined low vehicle speed range and when the detected road gradient is not less than a preset reference gradient, sets a target driving force for constant-speed driving of the motor vehicle at a target vehicle speed, which is set to be not higher than the preset reference vehicle speed, based on the detected road gradient, when the detected driving force demand is not less than the target driving force, the low-speed drive control module controlling operation of the internal combustion engine to output the driving force demand, when the driving force demand is less than the target driving force, the low-speed drive control module controlling the operation of the internal combustion engine to output the target driving force.

When the measured vehicle speed is not higher than the preset reference vehicle speed and when the detected road gradient is not less than the preset reference gradient, the third motor vehicle of the invention sets the target driving force for constant-speed driving of the motor vehicle at the target vehicle speed, which is set to be not higher than the preset reference vehicle speed, based on the road gradient. When the driving force demand in response to the driver's operation is not less than the target driving force, the operation of the internal combustion engine is controlled to output the driving force demand. When the driving force demand is less than the target driving force, the operation of the internal combustion engine is controlled to output the target driving force. Namely the operation of the internal combustion engine is controlled to output the greater between the target driving force for the constant-speed driving of the motor vehicle at the target vehicle speed and the driving force demand in response to the driver's operation. This arrangement effectively prevents an unexpected slide-down of the vehicle along the road gradient, regardless of the driver's operation and the operation amount and ensures a smooth hill start and a smooth hill drive. The driving force demand includes a braking force demand, for example, in response to the driver's depression of a brake pedal, as well as a normal driving force demand in a vehicle-running direction, for example, in response to the driver's depression of an accelerator pedal.

In one preferable embodiment of the third motor vehicle of the invention; the low-speed drive control module sets the target driving force based on a vehicle speed difference between the measured vehicle speed and the target vehicle speed. This arrangement sets the target driving force according to the vehicle speed and thus enables the motor vehicle to run at the target vehicle speed.

In another preferable embodiment of the third motor vehicle of the invention, the low-speed drive control module uses at least part of the detected driving force demand, the detected road gradient, and the measured vehicle speed to specify presence or absence of a bump on a road surface, and upon specification of the presence of a bump, sets the target driving force based on the specification result. In this structure, the operation of the internal combustion engine is controlled with the target driving force, which is set according to the presence or the absence of a bump on the road surface.

In still another preferable embodiment of the third motor vehicle of the invention, when the detected driving force demand is a brake demand, the low-speed drive control module sets the target driving force based on the brake demand. This arrangement enables setting of an adequate target throttle opening and ensures output of a suitable driving force from the internal combustion engine in response to a brake demand.

In still another preferable embodiment of the third motor vehicle of the invention, the low-speed drive control module identifies a low friction-road drive condition where a friction coefficient of a road surface is not higher than a predetermined level, based on a specific identification condition, upon identification of the low friction-road drive condition, the low-speed drive control module making a correction to reduce the target driving force. This arrangement effectively prevents a potential slip of the motor vehicle. The third motor vehicle further includes a motor that is capable of outputting a driving force to a different axle other than one axle that receives the driving force output from the internal combustion engine. When the target driving force is adjusted to have a reduction, the low-speed drive control module controls the motor to output a driving force corresponding to the reduction. The motor outputs the driving force corresponding to the reduction of the target throttle opening. This arrangement thus ensures a smooth hill start or a smooth hill drive of the vehicle on the road surface under the low friction-road drive condition.

In still another preferable embodiment of the third motor vehicle of the invention, the motor vehicle further includes a motor that is capable of outputting a driving force to one axle that receives the driving force output from the internal combustion engine or a different axle other than the one axle; and a rotation speed measurement unit that measures a rotation speed of the internal combustion engine. When the internal combustion engine is driven with at least the target driving force, the low-speed drive control module controls the motor to output a driving force corresponding to a rotation speed difference between the measured rotation speed and an expected rotation speed of the internal combustion engine for output of the target driving force. When a delayed response of the internal combustion engine causes insufficient output of the required driving force from the internal combustion engine, the motor compensates for the insufficiency of the driving force. This arrangement thus prevents an unexpected slide-down of the vehicle during a hill start or during a hill drive and ensures a smooth hill drive.

In still another preferable embodiment of the third motor vehicle of the invention, the motor vehicle further includes a running direction setting unit that sets a running direction of the motor vehicle in response to the driver's operation. When the running direction set by the running direction setting unit is a forward direction, the low-speed drive control module sets the target driving force according to a first relation against the road gradient. When the running direction set by the running direction setting unit is a reverse direction, the low-speed drive control module sets the target driving force according to a second relation, which sets a smaller driving force against the road gradient than a driving force set in the first relation. In this embodiment, the target driving force is set according to the running direction of the vehicle. The lower target driving force is set against the road gradient during a drive of the vehicle in the reverse direction than the target driving force set during a drive of the vehicle in the forward direction. This arrangement effectively protects the driver from the potential anxiety, uneasiness, and uncomfortable feeling caused by the acceleration in the reverse direction, which is opposite to the normal driving direction. The third motor vehicle further includes a target vehicle speed setting unit that sets a first vehicle speed to the target vehicle speed when the running direction set by the running direction setting unit is a forward direction, and sets a second vehicle speed, which is lower than the first vehicle speed, to the target vehicle speed when the running direction set by the running direction setting unit is a reverse direction. This arrangement more effectively protects the driver from the potential anxiety, uneasiness, and uncomfortable feeling caused by the acceleration in the forward direction, which is normal driving direction.

The present invention is also directed to a first control method of a motor vehicle. The motor vehicle includes: an internal combustion engine that has an output shaft and is capable of outputting a driving force for driving the motor vehicle; and a driving force transmission mechanism that is linked to the output shaft of the internal combustion engine and to an axle and, in at least a predetermined low vehicle speed range, transmits a driving force corresponding to a rotation speed of the internal combustion engine to the axle. The first control method controls the motor vehicle when a measured vehicle speed is not higher than a preset reference vehicle speed included in the predetermined low vehicle speed range and when a detected road gradient is not less than a preset reference gradient. The first control method includes the steps of: (a) setting a target rotation speed of the internal combustion engine corresponding to a driving force required for constant-speed driving of the motor vehicle at a target vehicle speed, which is set to be not higher than the preset reference vehicle speed; (b) setting a target throttle opening for driving the internal combustion engine at the set target rotation speed; and (c) when a required throttle opening corresponding to a driving force demand in response to a driver's operation is not less than the target throttle opening, controlling operation of the internal combustion engine with the required throttle opening, when the required throttle opening is less than the target throttle opening, controlling the operation of the internal combustion engine with the target throttle opening.

In one preferable embodiment of the first control method invention, when the measured vehicle speed is not higher than the preset reference vehicle speed and when the detected road gradient is not less than the preset reference gradient, the first motor vehicle of the invention sets the target rotation speed of the internal combustion engine corresponding to the driving force required for constant-speed driving of the motor vehicle at the target vehicle speed, which is set to be not higher than the preset reference vehicle speed, and sets the target throttle opening for driving the internal combustion engine at the set target rotation speed. When the required throttle opening corresponding to the driving force demand in response to the driver's operation is not less than the target throttle opening, the operation of the internal combustion engine is controlled with the required throttle opening. When the required throttle opening is less than the target throttle opening, the operation of the internal combustion engine is controlled with the target throttle opening. Namely the operation of the internal combustion engine is controlled with the greater between the target throttle opening for constant-speed driving of the motor vehicle at the target vehicle speed and the required throttle opening corresponding to the driver's driving force demand. This arrangement effectively prevents an unexpected slide-down of the vehicle along the road gradient, regardless of the driver's operation and the operation amount and ensures a smooth hill start and a smooth hill drive. The driving force demand includes a braking force demand, for example, in response to the driver's depression of a brake pedal, as well as a normal driving force demand in a vehicle-running direction, for example, in response to the driver's depression of an accelerator pedal. The first control method of the invention may adopt any of the various arrangements with regard to the control by the low-speed drive control module in the first motor vehicle of the invention.

The present invention is also directed to a second control method of a motor vehicle. The motor vehicle includes: an internal combustion engine that has an output shaft and is capable of outputting a driving force for driving the motor vehicle; and a driving force transmission mechanism that is linked to the output shaft of the internal combustion engine and to an axle and, in at least a predetermined low vehicle speed range, transmits a driving force corresponding to a rotation speed of the internal combustion engine to the axle. The second control method controls the motor vehicle when a measured vehicle speed is not higher than a preset reference vehicle speed included in the predetermined low vehicle speed range and when a detected road gradient is not less than a preset reference gradient. The control method including the steps of: (a) setting a target throttle opening to make the internal combustion engine output a driving force required for constant-speed driving of the motor vehicle at a target vehicle speed, which is set to be not higher than the preset reference vehicle speed; and (b) when a required throttle opening corresponding to a driving force demand in response to a driver's operation is not less than the target throttle opening, controlling operation of the internal combustion engine with the required throttle opening, and when the required throttle opening is less than the target throttle opening, controlling the operation of the internal combustion engine with the target throttle opening.

When the measured vehicle speed is not higher than the preset reference vehicle speed and when the detected road gradient is not less than the preset reference gradient, the second control method of a motor vehicle of the invention sets the target throttle opening to make the internal combustion engine output the driving force required for constant-speed driving of the motor vehicle at the target vehicle speed, which is set to be not higher than the preset reference vehicle speed. When a required throttle opening corresponding to the driving force demand in response to the driver's operation is not less than the target throttle opening, the operation of the internal combustion engine is controlled with the required throttle opening. When the required throttle opening is less than the target throttle opening, the operation of the internal combustion engine is controlled with the target throttle opening. Namely the operation of the internal combustion engine is controlled with the greater between the target throttle opening for constant-speed driving of the motor vehicle at the target vehicle speed and the required throttle opening corresponding to the driver's driving force demand. This arrangement effectively prevents an unexpected slide-down of the vehicle along the road gradient, regardless of the driver's operation and the operation amount and ensures a smooth hill start and a smooth hill drive. The driving force demand includes a braking force demand, for example, in response to the driver's depression of a brake pedal, as well as a normal driving force demand in a vehicle-running direction, for example, in response to the driver's depression of an accelerator pedal. The second control method of the invention may adopt any of the various arrangements with regard to the control by the low-speed drive control module in the second motor vehicle of the invention.

The present invention is also directed to a third control method of a motor vehicle. The motor vehicle includes: an internal combustion engine that has an output shaft and is capable of outputting a driving force for driving the motor vehicle; and a driving force transmission mechanism that is linked to the output shaft of the internal combustion engine and to an axle and, in at least a predetermined low vehicle speed range, transmits a driving force corresponding to a rotation speed of the internal combustion engine to the axle. The control method controls the motor vehicle when a measured vehicle speed is not higher than a preset reference vehicle speed included in the predetermined low vehicle speed range and when a detected road gradient is not less than a preset reference gradient. The third control method including the steps of: (a) setting a target driving force for constant-speed driving of the motor vehicle at a target vehicle speed, which is set to be not higher than the preset reference vehicle speed, based on the detected road gradient; and (b) when a driving force demand in response to a driver's operation is not less than the target driving force, controlling operation of the internal combustion engine to output the driving force demand, when the driving force demand is less than the target driving force, controlling the operation of the internal combustion engine to output the target driving force.

When the measured vehicle speed is not higher than the preset reference vehicle speed and when the detected road gradient is not less than the preset reference gradient, the third control method of a motor vehicle of the invention sets the target driving force for constant-speed driving of the motor vehicle at the target vehicle speed, which is set to be not higher than the preset reference vehicle speed, based on the road gradient. When the driving force demand in response to the driver's operation is not less than the target driving force, the operation of the internal combustion engine is controlled to output the driving force demand. When the driving force demand is less than the target driving force, the operation of the internal combustion engine is controlled to output the target driving force. Namely the operation of the internal combustion engine is controlled to output the greater between the target driving force for the constant-speed driving of the motor vehicle at the target vehicle speed and the driving force demand in response to the driver's operation. This arrangement effectively prevents an unexpected slide-down of the vehicle along the road gradient, regardless of the driver's operation and the operation amount and ensures a smooth hill start and a smooth hill drive. The driving force demand includes a braking force demand, for example, in response to the driver's depression of a brake pedal, as well as a normal driving force demand in a vehicle-running direction, for example, in response to the driver's depression of an accelerator pedal.

BEST MODES OF CARRYING OUT THE INVENTION

First Embodiment

Figure 1:
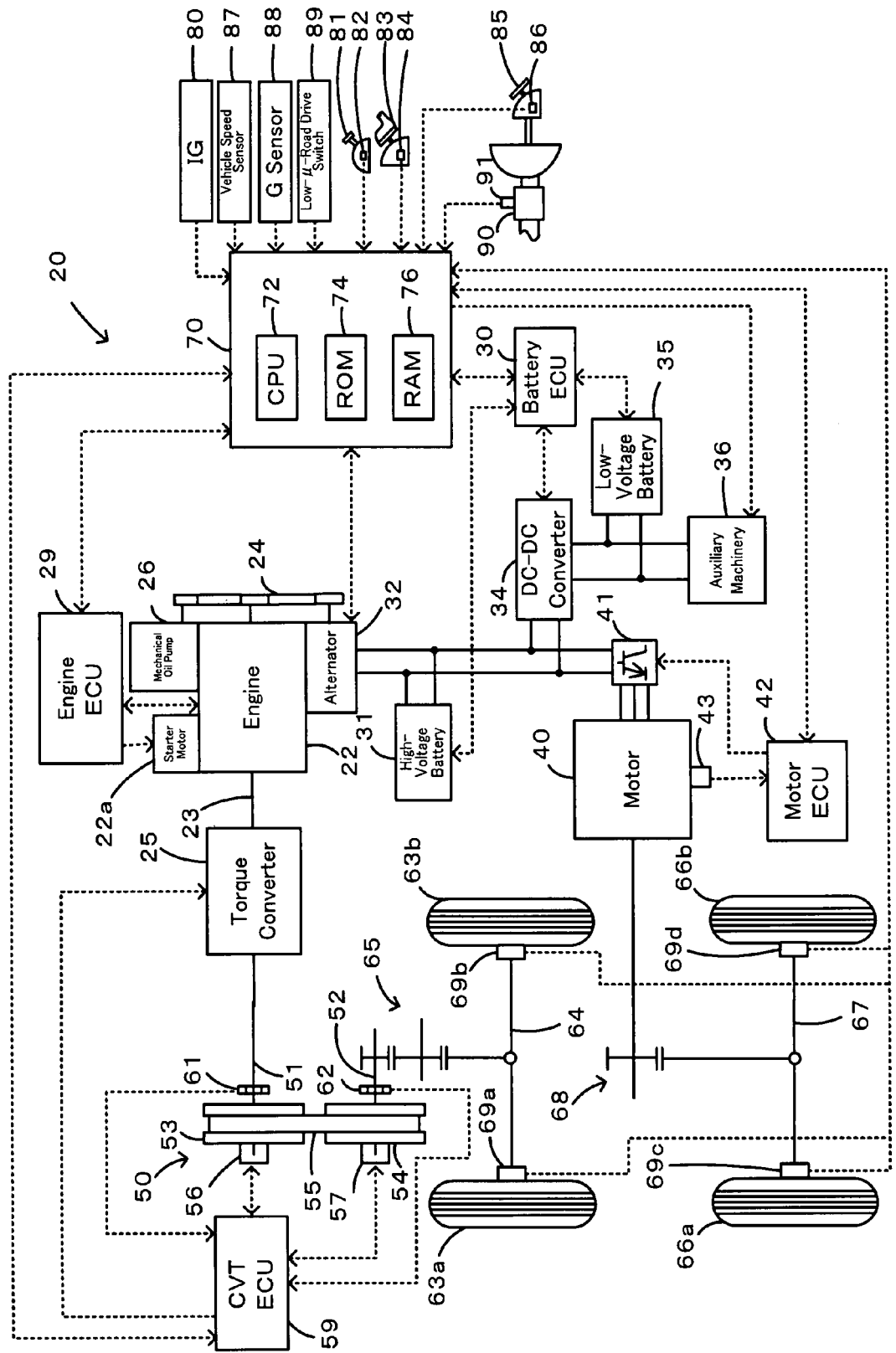
FIG. 1 schematically illustrates the configuration of a hybrid vehicle in one embodiment of the invention.

Some modes of carrying out the invention are discussed below as preferred embodiments with reference to the accompanied drawings. FIG. 1 schematically illustrates the configuration of a hybrid vehicle 20 in one embodiment of the invention. The hybrid vehicle 20 of the embodiment is a four-wheel drive vehicle and has a front-wheel drive system of transmitting the output power of an engine 22 to a front axle via a torque converter 25, a continuously variable transmission (CVT) 50, and a gear mechanism 65 to drive front wheels 63a and 63b, a rear wheel drive system of transmitting the output power of a motor 40 to a rear axle 67 via a gear mechanism 68 to drive rear wheels 66a and 66b, and a hybrid electronic control unit 70 of controlling the operations of the whole hybrid vehicle 20.

Figure 2:
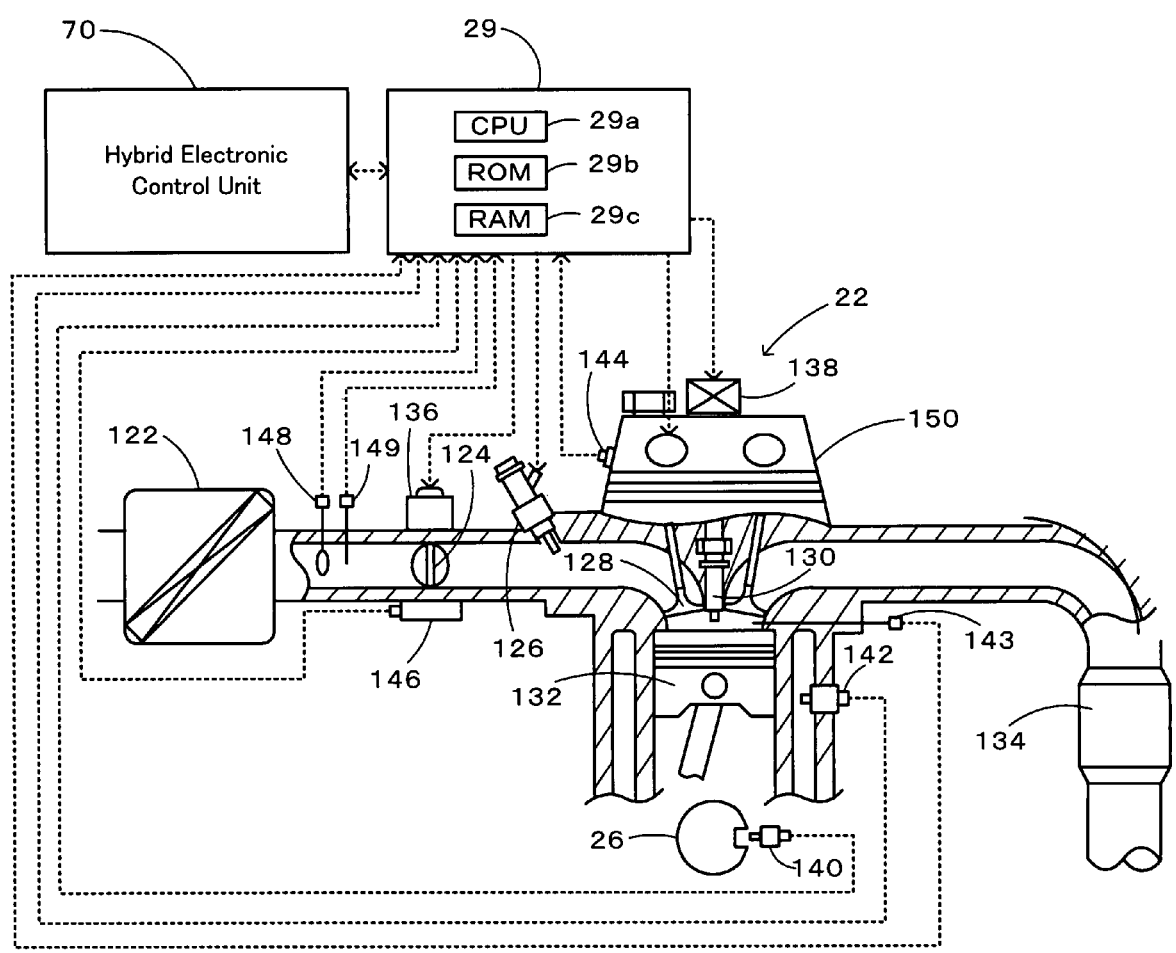
FIG. 2 schematically shows the structure of an engine mounted on the hybrid vehicle of the embodiment.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 23. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 29 (hereafter referred to as engine ECU 29). The engine ECU 29 is constructed as a microprocessor including a CPU 29a, a ROM 29b that stores processing programs, a RAM 29c that temporarily stores data, input and output ports (not shown), and a communication port (not shown). The engine ECU 29 receives, via its input port (not shown), signals from various sensors that measure and detect the conditions of the engine 22. The signals input into the engine ECU 29 include a crank position from a crank position sensor 140 detected as the rotational position of the crankshaft 23, a cooling water temperature from a water temperature sensor 142 measured as the temperature of cooling water in the engine 22, an in-cylinder pressure Pin from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal AF from an air flow meter 148 attached to an air intake conduit, and an intake air temperature from a temperature sensor 149 attached to the air intake conduit. The engine ECU 29 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 29 communicates with the hybrid electronic control unit 70. The engine ECU 29 receives control signals from the hybrid electronic control unit 70 to drive and control the engine 22, while outputting data regarding the driving conditions of the engine 22 to the hybrid electronic control unit 70 according to the requirements.

A starter motor 22a is attached to the crankshaft 23 of the engine 22. An alternator 32 and a mechanical oil pump 26 are also connected to the crankshaft 23 via a belt 24. The alternator 32 consumes the output power of the engine 22 and generates electric power to be supplied to the motor 40. The mechanical oil pump 26 consumes the output power of the engine 22 and generates hydraulic line pressures to actuate the CVT 50.

The torque converter 25 is a known hydraulic torque converter with a lockup clutch and outputs a torque corresponding to a rotation speed of the engine 22 to the CVT 50 on a start of the hybrid vehicle 20 or during a low-speed drive of the hybrid vehicle 20. The lockup clutch of the torque converter 25 is under control of a CVTECU 59 (discussed below).

The CVT 50 includes a primary pulley 53 that has a variable groove width and is linked to an input shaft 51, a secondary pulley 54 that has a variable groove width and is linked to an output shaft 52 or a driveshaft, a belt 55 that is set in the grooves of the primary pulley 53 and the secondary pulley 54, and hydraulic first and second actuators 56 and 57 that respectively vary the groove widths of the primary pulley 53 and the secondary pulley 54. Varying the groove widths of the primary pulley 53 and the secondary pulley 54 by the first actuator 56 and the second actuator 57 attains the continuously variable speed to convert the power of the input shaft 51 and output the converted power to the output shaft 52. A CVT electronic control unit 59 (hereafter referred to as CVTECU 59) takes charge of the transmission control of the CVT 50. The CVTECU 59 receives a rotation speed Nin of the input shaft 51 from a rotation speed sensor 61 attached to the input shaft 51 and a rotation speed Nout of the output shaft 52 from a rotation speed sensor 62 attached to the output shaft 52. The CVTECU 59 outputs driving signals to the first actuator 56 and to the second actuator 57. The CVTECU 59 communicates with the hybrid electronic control unit 70. The CVTECU 59 receives control signals from the hybrid electronic control unit 70 to regulate the change gear ratio of the CVT 50, while outputting data regarding the operating conditions of the CVT 50, for example, the rotation speed Nin of the input shaft 51 and the rotation speed Nout of the output shaft 52, to the hybrid electronic control unit 70 according to the requirements.

The motor 40 is constructed as a known synchronous motor generator that may be actuated both as a generator and as a motor. The motor 40 receives and transmits electric power from and to a high-voltage battery 31 via an inverter 41 and receives a supply of electric power from the alternator 32. The motor 40 is under operation control of a motor electronic control unit 42 (hereafter referred to as motor ECU 42). The motor ECU 42 receives various signals required for operating and controlling the motor 40, for example, signals from a rotational position detection sensor 43 that detects the rotational position of a rotor in the motor 40 and signals representing phase currents applied to the motor 40 from an electric current sensor (not shown). The motor ECU 42 also establishes communication with the hybrid electronic control unit 70. The motor ECU 42 outputs switching control signals to the inverter 41 in response to control signals received from the hybrid electronic control unit 70 to operate and control the motor 40, while outputting data regarding the operating conditions of the motor 40 to the hybrid electronic control unit 70 according to the requirements.

A high-voltage battery 31 is a secondary battery having a rated voltage Vh (for example, 42 [V]) and functions to accumulate electric power supplied from the alternator 32 and to transmit electric power to and from the motor 40. The high-voltage battery 31 is connected to a low-voltage battery 35 and auxiliary machinery 36 via a DC-DC converter 34 to supply electric power to the low-voltage battery 35 and the auxiliary machinery 36. The low-voltage battery 35 is a secondary battery having a lower rated voltage V1 (for example, 12 [V]) than the rated voltage Vh of the high-voltage battery 31. The high-voltage battery 31, the low-voltage battery 35, and the DC-DC converter 34 are under management and control of a battery electronic control unit 30 (hereafter referred to as battery ECU 30). The battery ECU 30 receives diverse signals required for control and management of the high-voltage battery 31 and the low-voltage battery 35, for example, inter-terminal voltages, charge-discharge electric currents, and battery temperatures of the respective batteries 31 and 35 measured by relevant sensors (not shown). The battery ECU 30 also establishes communication with the hybrid electronic control unit 70 and outputs data regarding the operating conditions of the respective batteries 31 and 35 to the hybrid electronic control unit 70 according to the requirements. The battery ECU 30 computes states of charges (SOC) of the high-voltage battery 31 and the low-voltage battery 35 from integrated values of charge-discharge currents for management of the respective batteries 31 and 35.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 87, and a longitudinal acceleration Gfr (acceleration in a longitudinal direction along the front to the rear of the hybrid vehicle 20) and a horizontal acceleration Grl (acceleration in a horizontal direction along the left to the right of the hybrid vehicle 20) from a G sensor 88. The hybrid electronic control unit 70 also receives, via its input port, a low-μ-road drive ON signal from a low-μ-road drive switch 89 that is mounted on an install panel located near the driver's seat and is switched on to set a low-μ-road drive condition for running on a low-μ road surface with a low static friction coefficient, for example, the wet road surface or the snow-covered road surface, a brake pressure Pb from a pressure sensor 91 attached to a brake master cylinder 90 that applies a hydraulic pressure (master cylinder pressure) to brake oil in response to the driver's operation of the brake pedal 85, and wheel speeds Vw1 through Vw4 from wheel speed sensors 69a through 69d respectively attached to the front wheels 63a and 63b and the rear wheels 66a and 66b. The hybrid electronic control unit 70 outputs, via its output port, control signals to the alternator 32 and driving signals to the auxiliary machinery 36. The hybrid electronic control unit 70 transmits various control signals and data to and from the engine ECU 29, the battery ECU 30, the motor ECU 42, and the CVTECU 59.

Figure 3:
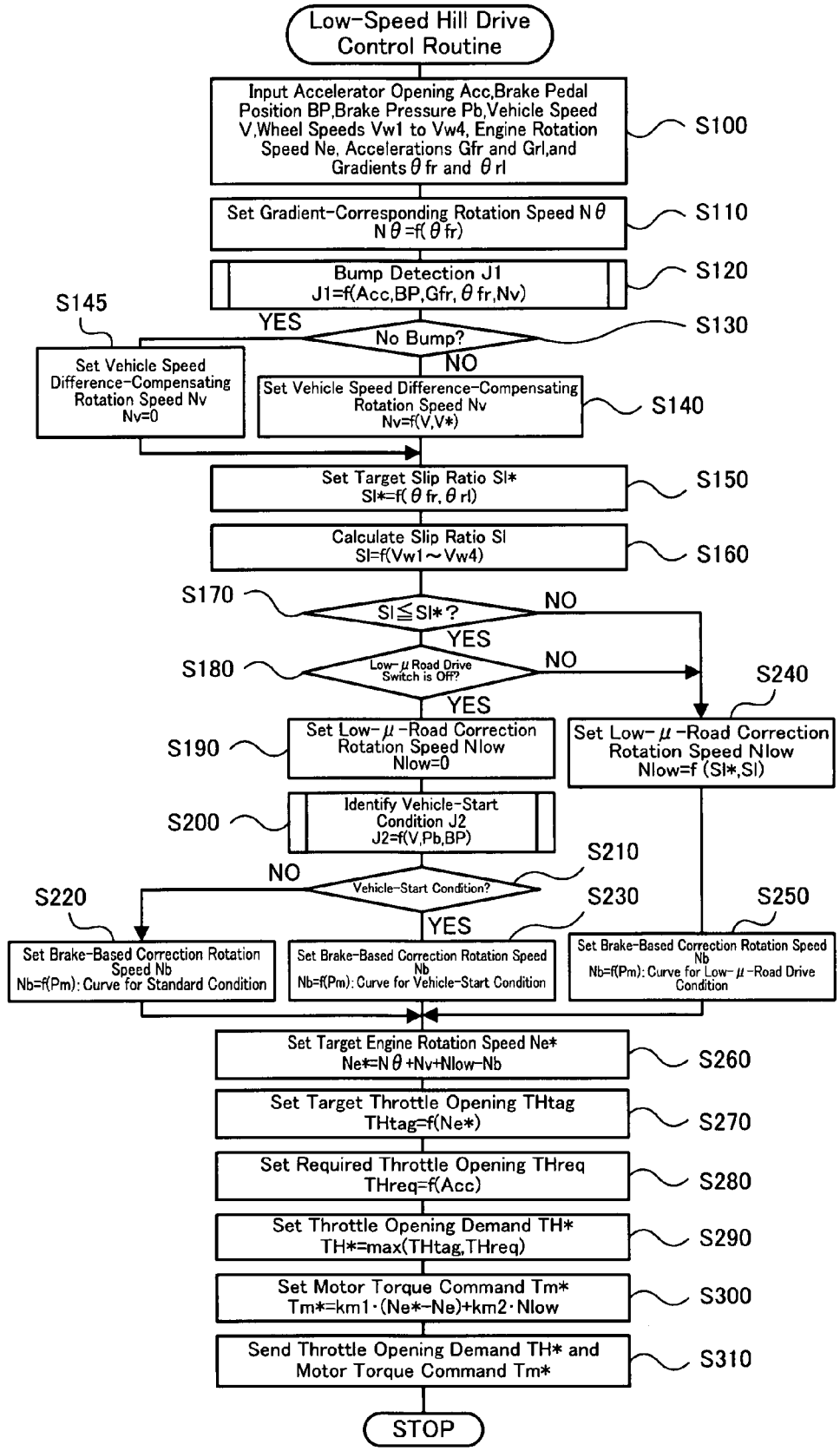
FIG. 3 is a flowchart showing a low-speed hill drive control routine executed by a hybrid electronic control unit included in the hybrid vehicle of the embodiment.

The description regards the operations of the hybrid vehicle 20 of the embodiment constructed as described above, especially a series of control operations on a hill start of the hybrid vehicle on a slope having a road gradient θ of not less than a preset reference gradient (for example, 10 degrees) or during a low-speed hill drive (for example, speed of not higher than 5 km/h) on such a slope. FIG. 3 is a flowchart showing a low-speed hill drive control routine executed by the hybrid electronic control unit 70 in a vehicle stop state on the slope or during a low-speed hill drive on the slope. This low-speed hill drive control routine is executed repeatedly at preset time intervals, for example, at every several msec.

In the low-speed hill drive control routine of FIG. 3, the CPU 72 of the hybrid electronic control unit 70 first inputs various data required for control, that is, the accelerator opening Acc from the accelerator pedal position sensor 84, the brake pedal position BP from the brake pedal position sensor 86, the brake pressure Pb from the pressure sensor 91, the vehicle speed V from the vehicle speed sensor 87, the wheel speeds Vw1 through Vw4 from the wheel speed sensors 69a through 69d, a rotation speed Ne of the engine 22, the longitudinal acceleration Gfr and the horizontal acceleration Grl from the G sensor 88, and a longitudinal vehicle gradient θfr (gradient in the longitudinal direction along the front to the rear of the hybrid vehicle 20) and a horizontal vehicle gradient θrl (gradient in the horizontal direction along the left to the right of the hybrid vehicle 20) (step S100). The rotation speed Ne of the engine 22 is computed from the crank position detected by the crank position sensor 140 and is received from the engine ECU 29 by communication. The longitudinal vehicle gradient θfr and the horizontal vehicle gradient θrl have been computed from the longitudinal acceleration Gfr and the horizontal acceleration Grl and written in a specific area of the RAM 76. The data input of step S100 accordingly reads the longitudinal vehicle gradient θfr and the horizontal vehicle gradient θrl from the specific area of the RAM 76.

After the data input, the CPU 72 sets a gradient-corresponding rotation speed Nθ corresponding to the input longitudinal vehicle gradient θfr (step S110). The gradient-corresponding rotation speed Nθ represents a rotation speed demand of the engine 22 to ensure output of a driving force required for driving the hybrid vehicle 20 on a slope of the gradient θfr at a target vehicle speed V*. The gradient-corresponding rotation speed Nθ may be calculated directly by multiplying the longitudinal vehicle slope θfr by a conversion factor. Another available method experimentally or otherwise specifies a variation in gradient-corresponding rotation speed Nθ against the longitudinal vehicle slope θfr and stores the specified variation as a conversion map in the ROM 74. The method reads a gradient-corresponding rotation speed Nθ corresponding to the given longitudinal vehicle gradient θfr from the conversion map. The target vehicle speed V* may be set to, for example, 3 km/h or 4 km/h.

Figure 4:
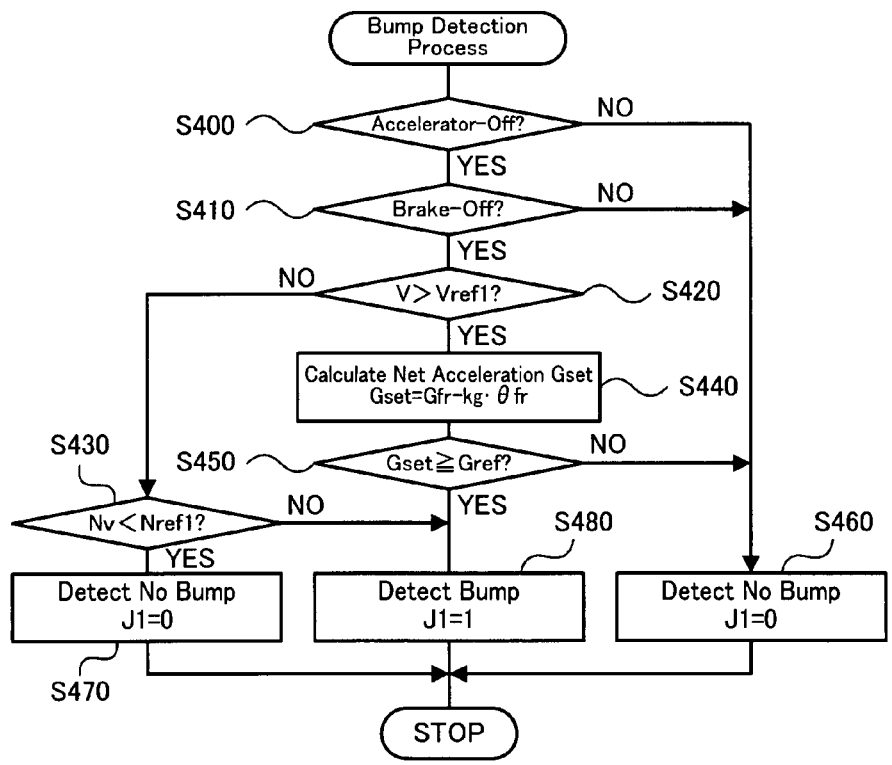
FIG. 4 is a flowchart showing the details of a bump detection process executed at step S120 in the low-speed hill drive control routine of FIG. 3.
Figure 5:
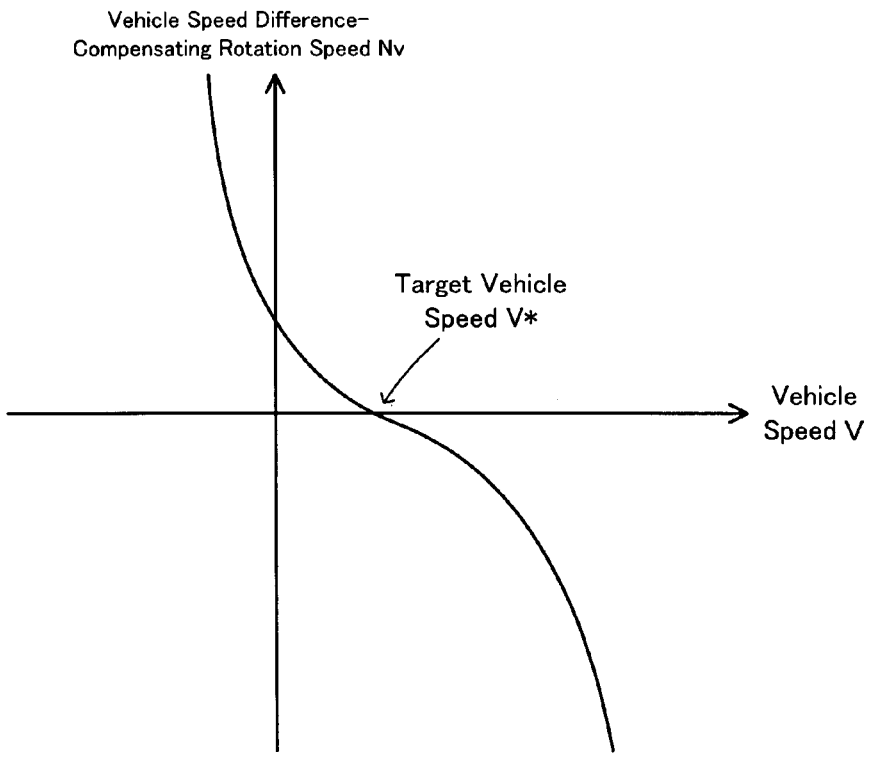
FIG. 5 shows one example of a vehicle speed difference-compensating rotation speed setting map.

The CPU 72 subsequently executes a bump detection process to specify whether the hybrid vehicle 20 is in contact with a bump, such as a barrier curb, based on the input accelerator opening Acc, the input brake pedal position BP, the input longitudinal acceleration Gfr, the input longitudinal vehicle gradient θfr, and a vehicle speed difference-compensating rotation speed Nv set in a previous cycle of this control routine (step S120). The vehicle speed difference-compensating rotation speed Nv represents a correction value of the rotation speed of the engine 22 to cancel out a vehicle speed difference between the current vehicle speed V and the target vehicle speed V*. The vehicle speed difference-compensating rotation speed Nv is set according to, for example, a vehicle speed difference-compensating rotation speed setting map shown in FIG. 5. This map gives negative values to the vehicle speed difference-compensating rotation speed Nv for the vehicle speed V of higher than the target vehicle speed V* and positive values to the vehicle speed difference-compensating rotation speed Nv for the vehicle speed V of lower than the target vehicle speed V*. Such setting of the vehicle speed difference-compensating rotation speed Nv causes the actual vehicle speed V to approach the target vehicle speed V*. The details of the bump detection process executed at step S120 in the low-speed hill drive control routine of FIG. 3 are shown in the flowchart of FIG. 4. The bump detection process of FIG. 4 sequentially identifies an accelerator-on condition or an accelerator-off condition based on the input accelerator opening Acc (step S400) and a brake-on condition or a brake-off condition based on the input brake pedal position BP (step S410). In either the accelerator-on condition or the brake-on condition (step S400 or step S410: No), the bump detection is not available. The CPU 72 accordingly gives a detection result of no bump (J1=0) (step S460) and exits from this bump detection process of FIG. 4 to go back to the low-speed hill drive control routine of FIG. 3. In both the accelerator-off condition and the brake-off condition (steps S400 and S410: Yes), the vehicle speed V is compared with a preset reference vehicle speed Vref1, which is set sufficiently close to 0 (step S420). The result of the comparison specifies whether the hybrid vehicle 20 is practically at a stop. When the vehicle speed V is not higher than the preset reference vehicle speed Vref1 (step S420: No), it is determined that the hybrid vehicle 20 practically stops. In this state, the vehicle speed difference-compensating rotation speed Nv is compared with a preset reference rotation speed Nref1 (step S430). When the vehicle speed difference-compensating rotation speed Nv is not lower than the preset reference rotation speed Nref1 (step S430: No), the vehicle speed difference-compensating rotation speed Nv has a relatively large value, regardless of the practical stop of the hybrid vehicle 20. The CPU 72 accordingly gives a detection result of bump (J1=1) (step S480) and exits from this bump detection process of FIG. 4 to go back to the low-speed hill drive control routine of FIG. 3. When the vehicle speed difference-compensating rotation speed Nv is lower than the preset reference rotation speed Nref1 (step S430: Yes), on the other hand, the CPU 72 gives a detection result of no bump (J1=0) (step S470) and exits from this bump detection process of FIG. 4 to go back to the low-speed hill drive control routine of FIG. 3. When the vehicle speed V is higher than the preset reference vehicle speed Vref1 (step S420: Yes), on the other hand, it is determined that the hybrid vehicle 20 is not at a stop. The bump detection process then calculates a net acceleration Gset by subtracting the product of the longitudinal vehicle gradient θfr and a conversion factor kg from the longitudinal acceleration Gfr (step S440). The net acceleration Gset represents the longitudinal acceleration Gfr without the effect of the longitudinal vehicle gradient θfr. The calculated net acceleration Gset is then compared with a preset reference acceleration Gref, which is set to a level of not generally arising on a flat road without any bump (step S450). When the net acceleration Gset is equal to or higher than the preset reference acceleration Gref (step S450: Yes), the CPU 72 gives a detection result of bump (J1=1) (step S480) and exits from this bump detection process of FIG. 4 to go back to the low-speed hill drive control routine of FIG. 3. When the net acceleration Gset is lower than the preset reference acceleration Gref (step S450: No), on the other hand, the CPU 72 gives a detection result of no bump (J1=0) (step S460) and exits from this bump detection process of FIG. 4 to go back to the low-speed hill drive control routine of FIG. 3. In this manner, when the hybrid vehicle 20 practically stops in both the accelerator-off condition and the brake-off condition, the bump detection process determines whether the vehicle speed difference-compensating rotation speed Nv exceeds the required level (the preset reference rotation speed Nref1) and detects the presence or the absence of a bump based on the result of the determination. When the hybrid vehicle 20 is not at a stop, the bump detection process determines whether the net acceleration Gset (the longitudinal acceleration Gfr without the effect of the longitudinal vehicle gradient θfr) is equal to or higher than the preset reference acceleration Gref (the level of not generally arising on a flat road without any bump), and detects the presence or the absence of a bump based on the result of the determination. Referring back to the flowchart of FIG. 3, when the bump detection process of FIG. 4 (step S120) gives a detection result of no bump (step S130: No), the CPU 72 sets the vehicle speed difference-compensating rotation speed Nv based on the target vehicle speed V* and the current vehicle speed V (step S140). When the bump detection process of FIG. 4 gives a detection result of bump (step S130: Yes), on the other hand, the CPU 72 sets the vehicle speed difference-compensating rotation speed Nv equal to 0 (step S145). This setting prevents the engine 22 from being driven at the vehicle speed difference-compensating rotation speed Nv over the required level.

Figure 6:
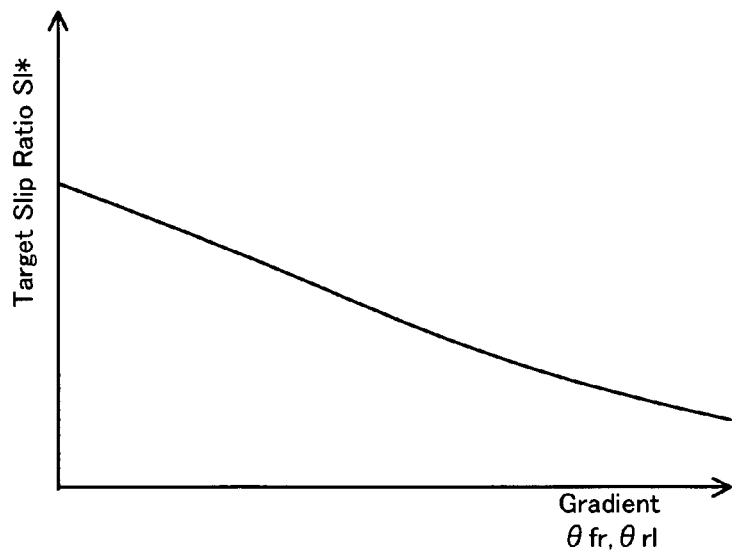
FIG. 6 shows one example of a target slip ratio setting map.
Figure 7:
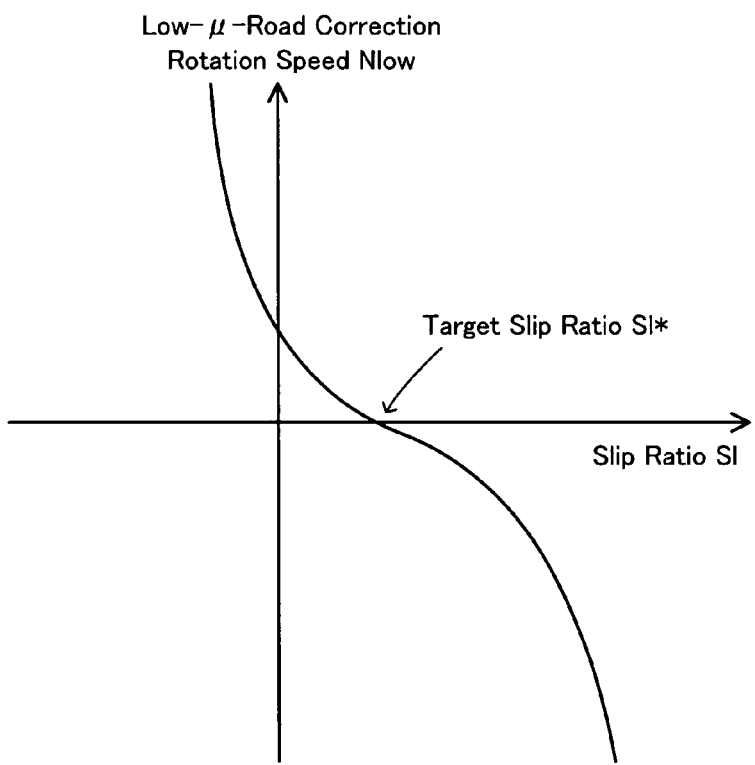
FIG. 7 shows a variation in low-μ-road correction rotation speed Nlow against slip ratio Sl across a target slip ratio Sl*.
Figure 8:
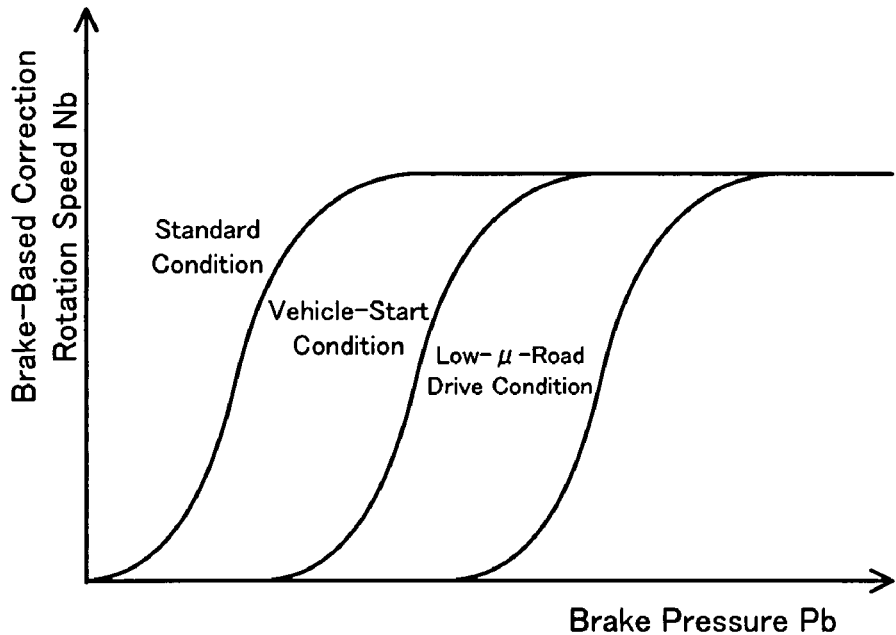
FIG. 8 shows one example of a brake-based correction rotation speed setting map with three different curves for standard condition, vehicle-start condition, and low-μ-road drive condition.

The CPU 72 subsequently sets a target slip ratio Sl* based on the longitudinal vehicle gradient θfr and the horizontal vehicle gradient θrl (step S150), and calculates a slip ratio Sl of the front wheels 63a and 63b based on the input wheel speeds Vw1 through Vw4 (step S160). The calculated slip ratio Sl is compared with the target slip ratio Sl* (step S170). The concrete calculation procedure of this embodiment first excludes the maximum wheel speed among the wheel speeds Vw1 through Vw4, calculates an average wheel speed of the remaining three wheel speeds, and divides the difference between the calculated average wheel speed and the wheel speed of the front wheels 63a and 63b by the calculated average wheel speed. This gives the slip ratio Sl. The concrete procedure of setting the target slip ratio Sl* in this embodiment stores in advance a variation in target slip ratio Sl* against gradient θ as a target slip ratio setting map in the ROM 74. The procedure then reads a target slip ratio in the longitudinal direction corresponding to the given longitudinal vehicle gradient θfr and a target slip ratio in the horizontal direction corresponding to the given horizontal vehicle gradient θrl from the target slip ratio setting map, and sets the smaller between the two target slip ratios to the target slip ratio Sl*. One example of the target slip ratio setting map is given in FIG. 6. As shown in the target slip ratio setting map of FIG. 6, the target slip ratio Sl* decreases with an increase in longitudinal vehicle gradient θfr or in horizontal vehicle gradient θrl. As is generally known in the art, the slip ratio Sl in a range of 0.2 to 0.3 gives the maximum static friction coefficient of the road surface and has the highest transmission rate of a driving force. The slip ratio Sl over this range causes the unstable condition of the vehicle. The maximum static friction coefficient of the road surface depends upon the season, the location, and the road surface condition. The target slip ratio Sl* is thus set to a slightly lower value than the above range. The vehicle in the unstable state on a hill road surface has the greater difficulty in recovery than the vehicle in the unstable state on a flat road surface. The procedure of this embodiment accordingly sets the lower target slip ratio Sl* for the greater gradient θfr or θrl to ensure the stability of the vehicle. When the slip ratio Sl is greater than the target slip ratio Sl* (step S170: No), it is determined that the hybrid vehicle 20 runs on a low-μ-road surface. In order to control the power output from the engine 22, the CPU 72 sets a low-μ-road correction rotation speed Nlow based on the difference between the slip ratio Sl and the target slip ratio Sl* (step S240) and sets a brake-based correction rotation speed Nb for the low-μ-road based on the brake pressure Pb or the pressure of the brake master cylinder (step S250). The concrete procedure of setting the low-μ-road correction rotation speed Nlow in this embodiment stores in advance a variation in low-μ-road correction rotation speed Nlow against the difference between the slip ratio Sl and the target slip ratio Sl* as a low-μ-road correction rotation speed setting map in the ROM 74. The procedure reads a low-μ-road correction rotation speed Nlow corresponding to the given difference between the slip ratio Sl and the target slip ratio Sl* from the low-μ-road correction rotation speed setting map. One example of the low-μ-road correction rotation speed setting map is given in FIG. 7. As shown in the low-μ-road correction rotation speed setting map of FIG. 7, the low-μ-road correction rotation speed Nlow decreases to give a greater negative value with an increase in slip ratio Sl over the target slip ratio Sl*. The brake-based correction rotation speed Nb takes into account the braking force output in response to the driver's depression of the brake pedal 85 and decreases the power output of the engine 22 in a range of not causing an unexpected slide-down of the hybrid vehicle 20 along the slope. The brake-based correction rotation speed Nb is set according to a brake-based correction rotation speed setting map. The brake-based correction rotation speed setting map gives different curves for a standard condition during a low-speed drive or during deceleration of the vehicle, for a vehicle-start condition to start the vehicle, and for a low-μ-road drive condition during a drive on the slippery low-μ-road surface. One example of the brake-based correction rotation speed setting map is given in FIG. 8. This map has three different curves for the standard condition, for the vehicle-start condition, and for the low-μ-road drive condition. The brake-based correction rotation speed setting map of FIG. 8 sets the lower brake-based correction rotation speed Nb under the vehicle-start condition than the brake-based correction rotation speed Nb under the standard condition against the same brake pressure Pb. The brake-based correction rotation speed Nb set under the low-μ-road drive condition is further lower than the brake-based correction rotation speed Nb set under the vehicle-start condition against the same brake pressure Pb. The reduced effect of the driver's brake operation on the output of the engine 22 under the vehicle-start condition ensures a smooth start of the hybrid vehicle 20. The further reduction of the effect of the driver's brake operation on the output of the engine 22 under the low-μ-road drive condition reduces a variation in output of the engine 22 on the road surface and attains a stable drive of the hybrid vehicle 20. As mentioned previously, under the low-μ-road drive condition, the low-μ-road correction rotation speed Nlow makes a correction to decrease the output of the engine 22. The low-speed hill drive control routine of this embodiment sets the low-μ-road correction rotation speed Nlow (step S240) and sets the brake-based correction rotation speed Nb (step S250) according to the curve for the low-μ-road drive condition in the brake-based correction rotation speed setting map, not only in response to the slip ratio Sl of greater than the target slip ratio Sl* at step S170 but in response to a switch-on operation of the low-μ-road drive switch 89 mounted on the install panel located near the driver's seat at step S180.

Figure 9:
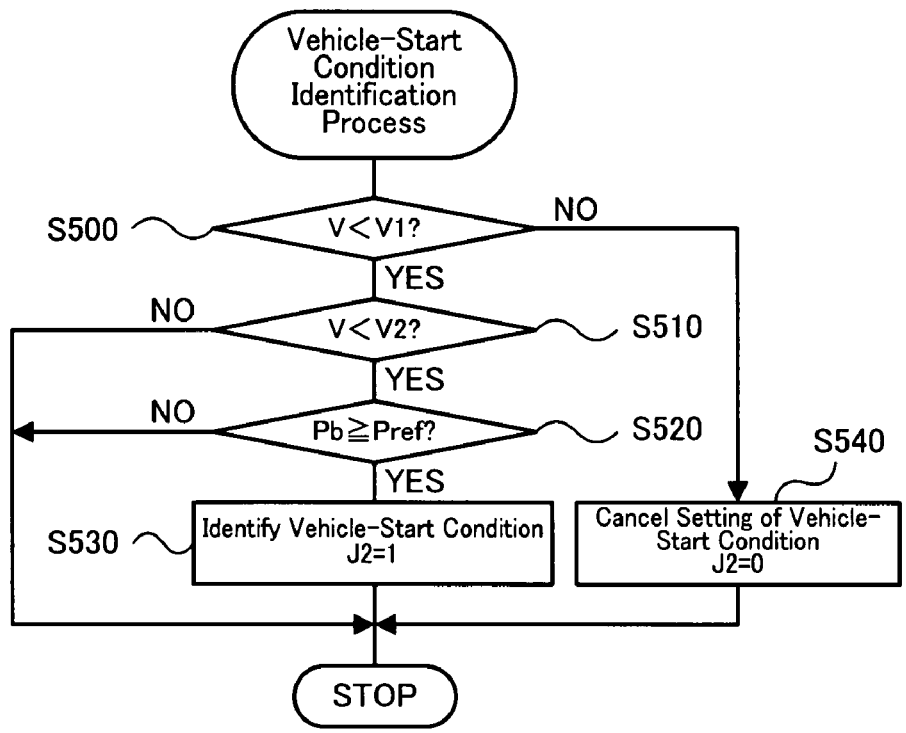
FIG. 9 is a flowchart showing the details of a vehicle-start identification process executed at step S200 in the low-speed hill drive control routine of FIG. 3.

When the slip ratio Sl is equal to or lower than the target slip ratio Sl* (step S170: Yes) and when the low-μ-road drive switch 89 is off (step S180), the CPU 72 sets the low-μ-road correction rotation speed Nlow equal to 0 (step S190) and determines whether the hybrid vehicle 20 is under the vehicle-start condition, based on the vehicle speed V, the brake pressure Pb, and the brake pedal position BP (step S200). When the determination result shows that the hybrid vehicle 20 is not under the vehicle-start condition (step S210: No), the CPU 72 refers to the curve for the standard condition in the brake-based correction rotation speed setting map and sets the brake-based correction rotation speed Nb corresponding to the brake pressure Pb (step S220). When the determination result shows that the hybrid vehicle 20 is under the vehicle-start condition (step S210: Yes), on the other hand, the CPU 72 refers to the curve for the vehicle-start condition in the brake-based correction rotation speed setting map and sets the brake-based correction rotation speed Nb corresponding to the brake pressure Pb (step S230). The determination of whether the hybrid vehicle 20 is under the vehicle-start condition is performed according to a vehicle-start condition identification process shown in the flowchart of FIG. 9. The vehicle-start condition identification process sequentially compares the vehicle speed V with a reference speed V1 (for example, 5 km/h) and with a threshold speed V2 (for example, 3 km/h) (steps S500 and S510). The reference speed V1 is used to identify a low-speed drive, and the threshold speed V2 is used to identify completion of a vehicle start. When the vehicle speed V is lower than both the reference speed V1 and the threshold speed V2 (steps S500 and S510: Yes), the vehicle-start condition identification process compares the brake pressure Pb with a preset reference pressure Pref, which is set to be not lower than a required brake pressure for stopping the vehicle (step S520). When the brake pressure Pb is equal to or higher than the preset reference pressure Pref (step S520: Yes), the CPU 72 identifies the vehicle-start condition (J2=1) (step S530) and terminates the vehicle-start condition identification process of FIG. 9. When the vehicle speed is not lower than the reference speed V1 (step S500: No), on the other hand, the CPU 72 identifies no vehicle-start condition and cancels the setting of the vehicle-start condition (J2=0) (step S540) and terminates the vehicle-start condition identification process of FIG. 9. When the vehicle speed V is lower than the reference speed V1 (step S500: Yes) but is not lower than the threshold speed V2 (step S510: No) or when the brake pressure Pb is lower than the preset reference pressure Pref (step S520: No), it is expected that the hybrid vehicle 20 is going to start or is going to decelerate for a full stop. The CPU then keeps the current vehicle condition and immediately terminates the vehicle-start condition identification process of FIG. 9 without identification of the vehicle-start condition or cancellation of the setting of the vehicle-start condition.

After setting the gradient-corresponding rotation speed Nθ, the vehicle speed difference-compensating rotation speed Nv, the low-μ-road correction rotation speed Nlow, and the brake-based correction rotation speed Nb, the CPU 72 subtracts the brake-based correction rotation speed Nb from the sum of the gradient-corresponding rotation speed Nθ, the vehicle speed difference-compensating rotation speed Nv, and the low-μ-road correction rotation speed Nlow to set a target engine rotation speed Ne* of the engine 22 (step S260). The CPU 72 subsequently sets a target throttle opening THtag as a throttle opening required for driving the engine 22 at the set target engine rotation speed Ne* (step S270). The CPU 72 then sets a required throttle opening THreq as a throttle opening based on the accelerator opening Acc corresponding to the driver's depression amount of the accelerator pedal 83 (step S280) and sets the greater between the target throttle opening THtag and the required throttle valve THreq to a throttle opening demand TH* (step S290). The concrete procedure of setting the target throttle opening THtag in this embodiment experimentally or otherwise specifies a relation between target engine rotation speed Ne* and throttle opening TH required for driving the engine 22 at the target engine rotation speed Ne* and stores the specified relation as a target throttle opening setting map in the ROM 74. The procedure reads a throttle opening TH corresponding to the given target engine rotation speed Ne* from the target throttle opening setting map and sets the read throttle opening TH to the target throttle opening THtag. The target throttle opening setting map, which is not specifically shown, gives the greater target throttle opening THtag with an increase in target engine rotation speed Ne*. The concrete procedure of setting the required throttle opening THreq in this embodiment stores in advance a variation in throttle opening TH against the accelerator opening Acc as a required throttle opening setting map in the ROM 74. The procedure reads a throttle opening TH corresponding to the given accelerator opening Acc from the required throttle opening setting map and sets the read throttle opening TH to the required throttle opening THreq. The required throttle opening setting map, which is not specifically shown, gives the greater required throttle opening THreq with an increase in accelerator opening Acc. In some cases, the power output of the engine 22 corresponding to the driver's depression amount of the accelerator pedal 83 may give an insufficient driving force against the road gradient and may cause an unexpected slide-down of the hybrid vehicle 20. Under such conditions, the drive control of this embodiment sets the target throttle opening THtag corresponding to the road gradient to the throttle opening demand TH*. This effectively prevents an unexpected slide-down of the hybrid vehicle 20.

After setting the throttle opening demand TH*, the CPU 72 sums up a torque corresponding to the difference between the target engine rotation speed Ne* and the actual rotation speed Ne of the engine 22 and a torque corresponding to a reduction of the target engine rotation speed Ne* by the low-μ-road correction rotation speed Nlow and sets the total torque to a torque command Tm* of the motor 40 (step S300). Setting the torque command Tm* of the motor 40 in this manner desirably enables the high-response motor 40 to compensate for the output insufficiency of the poor-response engine 22. The compensation of the output insufficiency effectively prevents an unexpected slide-down of the hybrid vehicle 20 along the slope due to the poor response of the engine 22. The motor 40 outputs an additional torque corresponding to the reduction of the engine rotation speed Ne by the low-μ-road correction rotation speed Nlow. This ensures output of a sufficient total driving force even under the low-μ-road drive condition.

The CPU 72 sends the throttle opening demand TH* to the engine ECU 29, while sending the torque command Tm* to the motor ECU 42 (step S310). The low-speed hill drive control routine of FIG. 3 is then terminated. The engine ECU 29 receives the throttle opening demand TH* and controls the throttle motor 136 to set the opening of the throttle valve 124 to the throttle opening demand TH* for the operation control of the engine 22. The motor ECU 42 receives the torque command Tm* and performs switching control of switching elements (not shown) included in the inverter 41 for the operation control of the motor 40 to output of a torque equivalent to the torque command Tm*.

As described above, the hybrid vehicle 20 of the embodiment sets the target engine rotation speed Ne* based on the gradient-corresponding rotation speed Nθ, which represents the rotation speed of the engine 22 to output the required driving force for driving the hybrid vehicle 20 at the target vehicle speed V* on the road surface of the longitudinal vehicle gradient θfr. The engine 22 is driven with the throttle opening demand TH*, which is the greater between the target throttle opening THtag for driving the engine 22 at the target engine rotation speed Ne* and the required throttle opening THreq based on the accelerator opening Acc representing the driver's depression amount of the accelerator pedal 83. Such drive control of the embodiment effectively prevents an unexpected slide-down of the hybrid vehicle 20 along the slope, irrespective of the driver's depression amount of the accelerator pedal 83 or the driver's depression amount of the brake pedal 85. This arrangement desirably ensures a smooth vehicle start or a smooth vehicle drive on the slope.

The hybrid vehicle 20 of the embodiment sets the target engine rotation speed Ne* based on the vehicle speed difference-compensating rotation speed Nv, which is set to cancel out the vehicle speed difference between the actual vehicle speed V and the target vehicle speed V*. Such setting enables output of an adequate driving force to stably drive the hybrid vehicle 20 at the low vehicle speed (target vehicle speed V*). The drive control of the embodiment detects the presence or the absence of a bump, such as a barrier curb, on the road surface. In the presence of a bump on the road surface, the drive control does not correct the target engine rotation speed Ne* based on the vehicle speed difference-compensating rotation speed Nv. This arrangement desirably prevents excess power output of the engine 22.

The hybrid vehicle 20 of the embodiment sets the brake-based correction rotation speed Nb corresponding to the brake pressure Pb that represents the driver's depression amount of the brake pedal 85, and sets the target engine rotation speed Ne* based on the brake-based correction rotation speed Nb. Such setting desirably prevents the excessive power output of the engine 22 and improves the total energy efficiency of the hybrid vehicle 20. The drive control of the embodiment identifies the driving condition of the hybrid vehicle 20 as the standard condition during a low-speed drive or during deceleration of the vehicle or as the vehicle-start condition to start the vehicle. The target engine rotation speed Ne* is set based on the brake-based correction rotation speed Nb, which is read from a suitable curve corresponding to this identification result in the brake-based correction rotation speed setting map. This arrangement attains the power output of the engine 22 reflecting the vehicle condition.

In response to identification of the low-μ-road drive condition based on the slip ratio Sl or in response to the driver's ON operation of the low-μ-road drive switch 89, the hybrid vehicle 20 of the embodiment sets the low-μ-road correction rotation speed Nlow to decrease the target engine rotation speed Ne*. This arrangement effectively prevents a potential slip of the front wheels 63a and 63b that receive the output power from the engine 22. The low-μ-road correction rotation speed Nlow is set according to the difference between the actual slip ratio Sl and the target slip ratio Sl*. This enables effective slip prevention. The target slip ratio Sl* is set corresponding to the longitudinal vehicle gradient θfr and the horizontal vehicle gradient θrl. Such setting effectively prevents a potential skid in the horizontal direction (left-to-right direction) of the vehicle, as well as a potential slip of the front wheels 63a and 63b. During a low-μ-road drive, the brake-based correction rotation speed Nb corresponding to the brake pressure Pb is read from the curve for the low-μ-road drive condition in the brake-based correction rotation speed setting map. The setting of the brake-based correction rotation speed Nb thus well reflects the road surface condition. In the event of a reduction of the target engine rotation speed Ne* under the low-μ-road drive condition, the motor 40 is controlled to output a torque corresponding to this reduction. This arrangement ensures output of a sufficient driving force required for the vehicle driving on the low-μ-road surface. The drive control of the embodiment thus attains a stable start and a stable low-speed drive of the vehicle even on a slope of slippery road surface condition.

The hybrid vehicle 20 of the embodiment controls the operation of the motor 40 to output a torque corresponding to the difference between the target engine rotation speed Ne* and the actual rotation speed Ne of the engine 22. This desirably enables the high-response motor 40 to compensate for the output insufficiency of the poor-response engine 22. The compensation of the output insufficiency effectively prevents an unexpected slide-down of the hybrid vehicle 20 along the slope due to the poor response of the engine 22.

Second Embodiment

A hybrid vehicle 20B is described below as a second embodiment of the invention. The hardware configuration of the hybrid vehicle 20B of the second embodiment is identical with that of the hybrid vehicle 20 of the first embodiment and is thus not specifically described here. The hardware elements in the hybrid vehicle 20B of the second embodiment are expressed by the same numerals and symbols as those allocated to the hardware elements in the hybrid vehicle 20 of the first embodiment.

Figure 11:
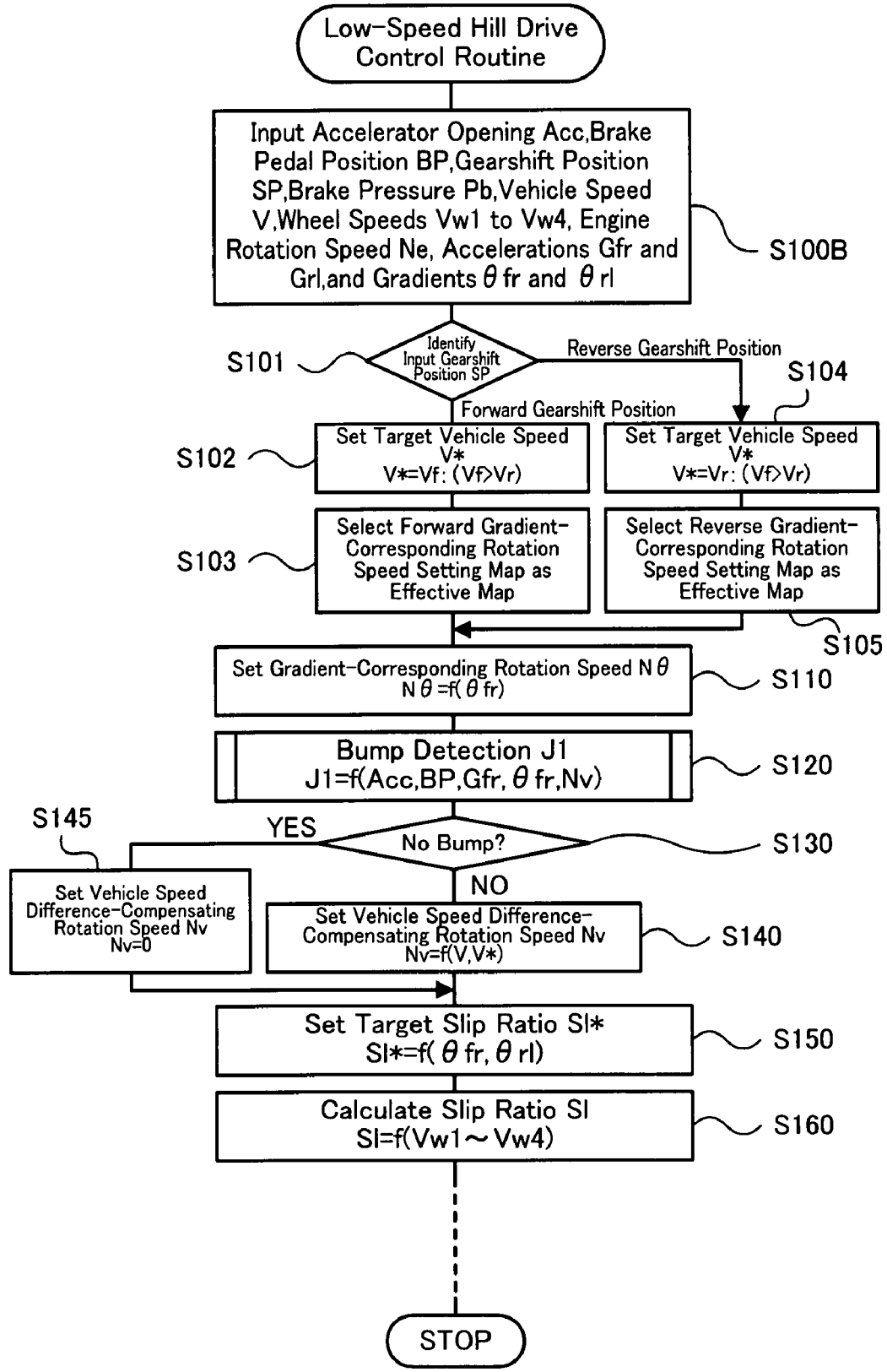
FIG. 11 is a flowchart showing a low-speed hill drive control routine executed by a hybrid electronic control unit in a hybrid vehicle of a second embodiment.

The hybrid vehicle 20B of the second embodiment executes a low-speed hill drive control routine of FIG. 11, instead of the low-speed hill drive control routine of FIG. 3. The low-speed hill drive control routine of FIG. 11 is similar to the low-speed hill drive control routine of FIG. 3 with some modifications. The modifications include replacement of step S100 with step S100B and addition of some steps, prior to step S110 where the gradient-corresponding rotation speed Nθ is set as the rotation speed of the engine 22 to output the required driving force for driving the vehicle at the target vehicle speed V* on a slope of the longitudinal vehicle gradient θfr. The replaced step S100B inputs the gearshift position SP from the gearshift position sensor 82, in addition to the accelerator opening Acc, the brake pedal position BP, the brake pressure Pb, the vehicle speed V, the wheel speeds Vw1 through Vw4, the rotation speed Ne of the engine 22, the longitudinal and horizontal accelerations Gfr and Grl of the vehicle, and the longitudinal vehicle gradient θfr and the horizontal vehicle gradient θrl. The additional steps before the existing step S110 sets the target vehicle speed V* and selects an effective gradient-corresponding rotation speed setting map according to the input gearshift position SP. The operations of the hybrid vehicle 20B of the second embodiment are basically similar to the operations of the hybrid vehicle 20 of the first embodiment. The following description thus regards only the different points in operations of the hybrid vehicle 20B of the second embodiment from those of the hybrid vehicle 20 of the first embodiment.

Figure 12:
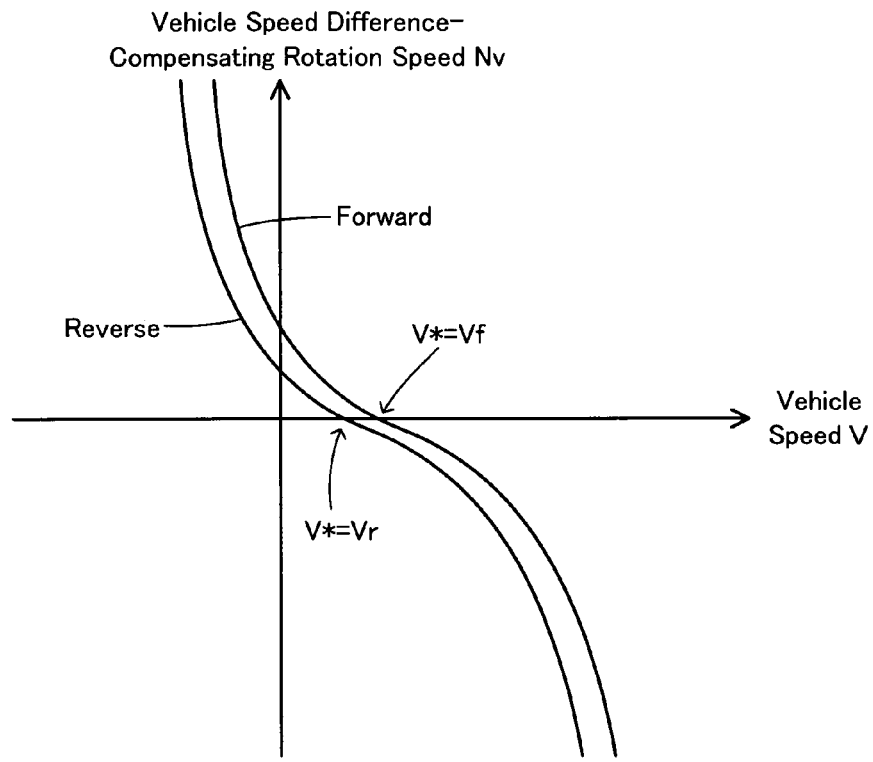
FIG. 12 shows a vehicle speed difference-compensating rotation speed setting map to be referred to in response to setting of a forward constant vehicle speed Vf to a target vehicle speed V* and a vehicle speed difference-compensating rotation speed setting map to be referred to in response to setting of a reverse constant vehicle speed Vr to the target vehicle speed V*.
Figure 13:
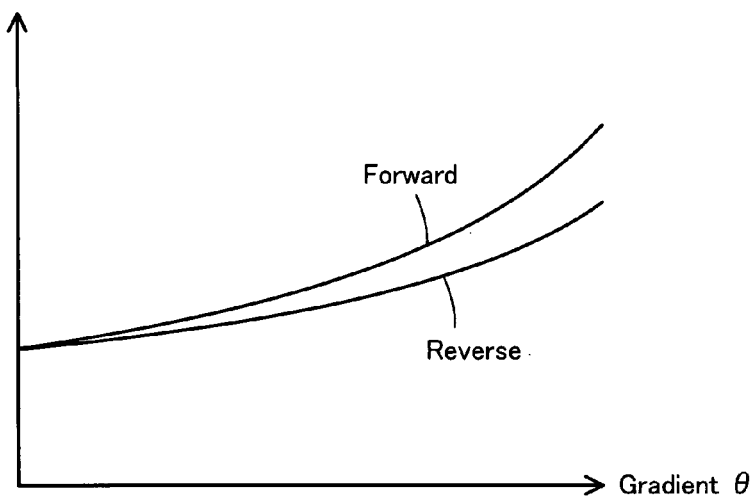
FIG. 13 shows one example of a forward gradient-corresponding rotation speed setting map and a reverse gradient-corresponding rotation speed setting map.

In the low-speed hill drive control routine of the second embodiment shown in FIG. 11, the CPU 72 of the hybrid electronic control unit 70 first inputs the gearshift position SP from the gearshift position sensor 82, in addition to the accelerator opening Acc, the brake pedal position BP, the brake pressure Pb, the vehicle speed V, the wheel speeds Vw1 through Vw4, the rotation speed Ne of the engine 22, the longitudinal and horizontal accelerations Gfr and Grl of the vehicle, and the longitudinal vehicle gradient θfr and the horizontal vehicle gradient θrl (step S100B). The CPU 72 then identifies whether the input gearshift position SP is a forward gearshift position, for example, Drive position, or a reverse gearshift position, for example, Reverse position (step S101). Upon identification of the input gearshift position SP as the forward gearshift position, the CPU 72 sets a forward constant vehicle speed Vf to the target vehicle speed V* (step S102) and selects a forward gradient-corresponding rotation speed setting map as an effective gradient-corresponding rotation speed setting map (step S103). The forward gradient-corresponding rotation speed setting map is used to set the gradient-corresponding rotation speed Nθ as the rotation speed of the engine 22 to output the required driving force for driving the hybrid vehicle 100B at the target vehicle speed V* on a slope of the longitudinal vehicle gradient θfr. Upon identification of the input gearshift position SP as the reverse gearshift position, on the other hand, the CPU 72 sets a reverse constant vehicle speed Vr, which is lower than the forward constant vehicle speed Vf, to the target vehicle speed V* (step S104) and selects a reverse gradient-corresponding rotation speed setting map as the effective gradient-corresponding rotation speed setting map (step S105). The reverse gradient-corresponding rotation speed setting map is also used to set the gradient-corresponding rotation speed Nθ as the rotation speed of the engine 22 to output the required driving force for driving the hybrid vehicle 100B at the target vehicle speed V* on a slope of the longitudinal vehicle gradient θfr. In this case, the target vehicle speed V* is set to the reverse constant vehicle speed Vr, which is lower than the forward constant vehicle speed Vf. The reverse gradient-corresponding rotation speed setting map accordingly gives the lower gradient-corresponding rotation speed Nθ against the same longitudinal vehicle gradient θfr than the forward gradient-corresponding rotation speed setting map. FIG. 12 shows a vehicle speed difference-compensating rotation speed setting map to be referred to in response to setting of the forward constant vehicle speed Vf to the target vehicle speed V* and a vehicle speed difference-compensating rotation speed setting map to be referred to in response to setting of the reverse constant vehicle speed Vr to the target vehicle speed V. FIG. 13 shows one example of the forward gradient-corresponding rotation speed setting map and the reverse gradient-corresponding rotation speed setting map. As shown in FIG. 12, the vehicle speed difference-compensating rotation speed setting map for the reverse constant vehicle speed Vr set to the target vehicle speed V* is shifted toward the lower vehicle speed from the vehicle speed difference-compensating rotation speed setting map for the forward constant vehicle speed Vf set to the target vehicle speed V*. As shown in FIG. 13, the reverse gradient-corresponding rotation speed setting map gives the lower gradient-corresponding rotation speed Nθ against the same longitudinal vehicle gradient θfr than the forward gradient-corresponding rotation speed setting map.

After setting the target vehicle speed V* and selecting the effective gradient-corresponding rotation speed setting map, the CPU 72 refers to the selected effective gradient-corresponding rotation speed setting map and sets the gradient-corresponding rotation speed Nθ as the rotation speed of the engine 22 to output the required driving force for driving the vehicle at the target vehicle speed V* on a slope of the longitudinal vehicle gradient θfr (step S110). The drive control of the second embodiment sets the gradient-corresponding rotation speed Nθ according to the selected effective gradient-corresponding rotation speed setting map. When the identified gearshift position SP is the forward gearshift position, the drive control routine of the second embodiment sets the gradient-corresponding rotation speed Nθ that is equal to the gradient-corresponding rotation speed Nθ set in the drive control routine of the first embodiment. When the identified gearshift position SP is the reverse gearshift position, the drive control routine of the second embodiment sets the lower gradient-corresponding rotation speed Nθ than the gradient-corresponding rotation speed Nθ set in the drive control routine of the first embodiment. This arrangement reduces the acceleration in the reverse direction and thus protects the driver and the passengers from the potential anxiety, uneasiness, and uncomfortable feeling caused by the acceleration in the reverse direction.

The CPU 72 subsequently executes a bump detection process to specify whether the hybrid vehicle 20 is in contact with a bump, such as a barrier curb, based on the input accelerator opening Acc, the input brake pedal position BP, the input longitudinal acceleration Gfr, the input longitudinal vehicle gradient θfr, and the vehicle speed difference-compensating rotation speed Nv set in a previous cycle of this control routine (step S120). When the bump detection process gives a detection result of no bump (step S130: No), the CPU 72 sets the vehicle speed difference-compensating rotation speed Nv based on the target vehicle speed V* and the current vehicle speed V (step S140). When the forward constant vehicle speed Vf is set to the target vehicle speed V* (step S102) upon identification of the gearshift position SP as the forward gearshift position (step S101), the vehicle speed difference-compensating rotation speed Nv is set based on the forward constant vehicle speed Vf and the current vehicle speed V. When the reverse constant vehicle speed Vr lower than the forward constant vehicle speed Vf is set to the target vehicle speed V* (step S104) upon identification of the gearshift position SP as the reverse gearshift position (step S101), the vehicle speed difference-compensating rotation speed Nv is set based on the reverse constant vehicle speed Vr and the current vehicle speed V. As clearly understood from the comparison between the two maps in FIG. 12, the vehicle speed difference-compensating rotation speed Nv is set to a smaller value in the reverse gearshift position than in the forward gearshift position. This arrangement enables the actual vehicle speed V to approach the target vehicle speed V* according to the gearshift position SP. When the bump detection process gives a detection result of bump (step S130: Yes), the CPU 72 sets the vehicle speed difference-compensating rotation speed Nv equal to 0 (step S145). This setting prevents the engine 22 from being driven at the vehicle speed difference-compensating rotation speed Nv over the required level. After setting the vehicle speed difference-compensating rotation speed Nv at either step S140 or step S145, the CPU 72 executes the subsequent processing of and after step S150.

As described above, the hybrid vehicle 20B of the second embodiment sets the lower target vehicle speed V* in the reverse gearshift position SP than the target vehicle speed V* set in the forward gearshift position SP and selects the reverse gradient-corresponding rotation speed setting map as the effective gradient-corresponding rotation speed setting map, which is used to set the gradient-corresponding rotation speed Nθ as the rotation speed of the engine 22 to output the required driving force for driving the vehicle at the target vehicle speed V* on a slope of the longitudinal vehicle gradient θfr. This arrangement reduces the acceleration in the reverse direction and thus protects the driver and the passengers from the potential anxiety, uneasiness, and uncomfortable feeling caused by the acceleration in the reverse direction. The hybrid vehicle 20B of the second embodiment also exerts the similar effects to those of the hybrid vehicle 20 of the first embodiment. Such advantageous functions include the effect of preventing an unexpected slide-down of the vehicle along the slope, irrespective of the driver's depression amount of the accelerator pedal 83 or the driver's depression amount of the brake pedal 85, the effect of ensuring a smooth vehicle start or a smooth vehicle drive on the slope, the effect of outputting an adequate driving force to stably drive the vehicle at the low vehicle speed (target vehicle speed V*), and the effect of preventing excess power output of the engine 22. The advantageous functions also include the effect of preventing the excessive power output of the engine 22 and improving the total energy efficiency of the vehicle, the effect of attaining the power output of the engine 22 reflecting the vehicle condition, the effect of preventing a potential slip of the front wheels 63a and 63b that receive the output power from the engine 22, and the effect of preventing a potential skid in the horizontal direction (left-to-right direction) of the vehicle as well as a potential slip of the front wheels 63a and 63b. The advantageous functions further include the effect of setting the brake-based correction rotation speed Nb well reflecting the road surface condition, the effect of ensuring output of a sufficient driving force required for the vehicle driving on the low-μ-road surface, the effect of attaining a stable start and a stable low-speed drive of the vehicle even on a slope of slippery road surface condition, the effect of enabling the high-response motor 40 to compensate for the output insufficiency of the poor-response engine 22, and the effect of preventing an unexpected slide-down of the vehicle along the slope due to the poor response of the engine 22.

In the hybrid vehicles 20 and 20B of the first and the second embodiments described above, the low-speed hill drive control sets the target engine rotation speed Ne* by subtracting the brake-based correction rotation speed Nb from the sum of the gradient-corresponding rotation speed Nθ, the vehicle speed difference-compensating rotation speed Nv, and the low-μ-road correction rotation speed Nlow, and sets the target throttle opening THtag based on the target engine rotation speed Ne*. The target throttle opening THtag may be set directly based on the gradient-corresponding rotation speed Nθ, the vehicle speed difference-compensating rotation speed Nv, the low-μ-road correction rotation speed Nlow, and the brake-based correction rotation speed Nb. The target throttle opening THtag may otherwise be set directly based on the longitudinal vehicle gradient θfr, the difference between the actual vehicle speed V and the target vehicle speed V*, the difference between the actual slip ratio Sl and the target slip ratio Sl* under the low-μ-road drive condition, and the brake pressure Pb. In the latter case, one available procedure sets a provisional throttle opening corresponding to the longitudinal vehicle gradient θfr and multiplies the provisional throttle opening by a correction factor based on the difference between the actual vehicle speed V and the target vehicle speed V*, a correction factor based on the difference between the actual slip ratio Sl and the target slip ratio Sl* under the low-μ-road drive condition, and a correction factor based on the brake pressure Pb to set the target throttle opening THtag.

In the hybrid vehicles 20 and 20B of the first and the second embodiments described above, the low-speed hill drive control sets the gradient-corresponding rotation speed Nθ, the vehicle speed difference-compensating rotation speed Nv, the low-μ-road correction rotation speed Nlow, and the brake-based correction rotation speed Nb, based on the longitudinal vehicle gradient θfr, the difference between the actual vehicle speed V and the target vehicle speed V*, the difference between the actual slip ratio Sl and the target slip ratio Sl* under the low-μ-road drive condition, and the brake pressure Pb. The drive control then sets the target engine rotation speed Ne* based on the gradient-corresponding rotation speed Nθ, the vehicle speed difference-compensating rotation speed Nv, the low-μ-road correction rotation speed Nlow, and the brake-based correction rotation speed Nb, and subsequently sets the target throttle opening THtag based on the target engine rotation speed Ne*. A possible modification may set a target driving force to be output to the front wheels 63a and 63b according to the longitudinal vehicle gradient θfr, the difference between the actual vehicle speed V and the target vehicle speed V*, the difference between the actual slip ratio Sl and the target slip ratio Sl* under the low-μ-road drive condition, and the brake pressure Pb, and controls the engine 22 to output the target driving force to the front wheels 63a and 63b. One available procedure of this modification sets a provisional target driving force corresponding to the longitudinal vehicle gradient θfr and multiplies the provisional target driving force by a correction factor based on the difference between the actual vehicle speed V and the target vehicle speed V*, a correction factor based on the difference between the actual slip ratio Sl and the target slip ratio Sl* under the low-μ-road drive condition, and a correction factor based on the brake pressure Pb to set the target driving force. The drive control then specifies a drive point of the engine 22 required for outputting the target driving force to the front wheels 63a and 63b and controls the engine 22 to be driven at the specified drive point.

The parameter for controlling the operation of the engine 22 to prevent an unexpected slide-down of the vehicle during a stop, during a starting operation, or during a low-speed drive on a slope is not restricted to the rotation speed of the engine 22, the throttle opening, or the driving force. Any other parameter set based on the longitudinal vehicle gradient θfr, the difference between the actual vehicle speed V and the target vehicle speed V*, the difference between the actual slip ratio Sl and the target slip ratio Sl* under the low-μ-road drive condition, and the brake pressure Pb may be used for such operation control of the engine 22.

Figure 10:
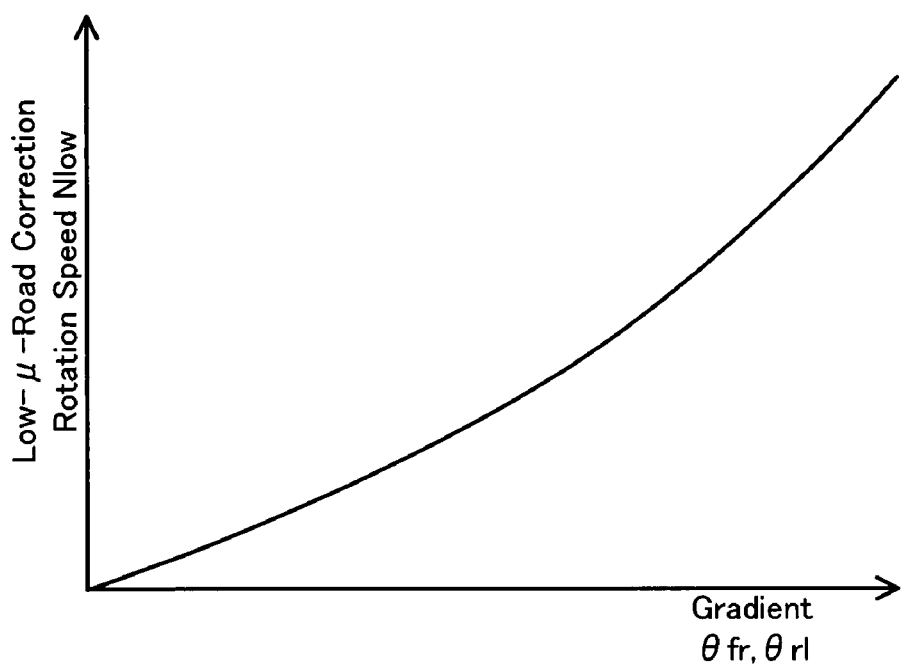
FIG. 10 shows a variation in low-μ-road correction rotation speed Nlow against longitudinal and horizontal vehicle gradients θfr and θrl.

In the hybrid vehicles 20 and 20B of the first and the second embodiments described above, in response to identification of the low-μ-road drive condition or in response to the driver's ON operation of the low-μ-road drive switch 89, the low-speed hill drive control sets the low-μ-road correction rotation speed Nlow based on the difference between the actual slip ratio Sl and the target slip ratio Sl*. The low-μ-road correction rotation speed Nlow may be set based on the longitudinal vehicle gradient θfr and the horizontal vehicle gradient θrl. In this application, the low-μ-road correction rotation speed Nlow is set to decrease the target engine rotation speed Ne* with an increase in longitudinal vehicle gradient θfr and horizontal vehicle gradient θrl. A map representing a variation in low-μ-road correction rotation speed Nlow against the longitudinal vehicle gradient θfr and horizontal vehicle gradient θrl is given in FIG. 10 as one example. The scale of the low-μ-road correction rotation speed Nlow in the map of FIG. 10 is different from that of the map used in the embodiment.

In the hybrid vehicles 20 and 20B of the first and the second embodiments described above, the low-speed hill drive control detects the presence or the absence of a bump, such as a barrier curb, on the road surface. In the event of detection of a bump, the drive control does not correct the target engine rotation speed Ne* based on the vehicle speed difference-compensating rotation speed Nv. A possible modification may set a smaller vehicle speed difference-compensating rotation speed Nv in the presence of a bump than the vehicle speed difference-compensating rotation speed Nv set in the absence of a bump. Such setting gives a smaller effect on the target engine rotation speed Ne* under the condition of bump detection. One available procedure of this modification may multiply the vehicle speed difference-compensating rotation speed Nv set in the absence of a bump by a specific correction factor of less than '1' to set the vehicle speed difference-compensating rotation speed Nv in the presence of a bump. Another possible modification may totally omit such detection of a bump, such as a barrier curb, on the road surface.

In the hybrid vehicles 20 and 20B of the first and the second embodiments described above, the target engine' rotation speed Ne* is set based on the vehicle speed difference-compensating rotation speed Nv, which is set to cancel out the difference between the actual vehicle speed V and the target vehicle speed V*. One possible modification may not set the vehicle speed difference-compensating rotation speed Nv for canceling out the difference between the actual vehicle speed V and the target vehicle speed V*.

In the hybrid vehicles 20 and 20B of the first and the second embodiments described above, the low-speed hill drive control sets the brake-based correction rotation speed Nb corresponding to the brake pressure Pb, which represents the driver's depression amount of the brake pedal 85, and sets the target engine rotation speed Ne* based on the brake-based correction rotation speed Nb. One possible modification may set the brake-based correction rotation speed Nb corresponding to the brake pedal position BP, instead of the brake pressure Pb, and set the target engine rotation speed Ne* based on the brake-based correction rotation speed Nb. The low-speed hill drive control identifies the driving condition of the vehicle as the standard condition during a low-speed drive or during deceleration of the vehicle or as the vehicle-start condition to start the vehicle and refers to a suitable curve corresponding to this identification result in the brake-based correction rotation speed setting map to set the brake-based correction rotation speed Nb. The brake-based correction rotation speed setting map maybe modified to have three or more different curves, for example, three different curves for a low-speed drive condition, a deceleration condition, and a vehicle-start condition. The procedure may identify the driving condition of the vehicle as one of the low-speed drive condition, the deceleration condition, and the vehicle-start condition and refer to a suitable curve corresponding to the identification result in the modified brake-based correction rotation speed setting map to set the brake-based correction rotation speed Nb. Another possible modification may totally omit setting of the brake-based correction rotation speed Nb corresponding to the brake pressure Pb.

In the hybrid vehicles 20 and 20B of the first and the second embodiments described above, in response to identification of the low-μ-road drive condition based on the slip ratio Sl, the low-speed hill drive control sets the low-μ-road correction rotation speed Nlow to decrease the target engine rotation speed Ne*. The identification of the low-μ-road drive condition for decreasing correction of the target rotation speed Ne* is not restrictively based on the slip ratio Sl but may be based on the outside temperature from an outside temperature sensor or based on raindrop information from a raindrop sensor. The low-speed hill drive control also sets the low-μ-road correction rotation speed Nlow to decrease the target engine rotation speed Ne*, in response to the driver's ON operation of the low-μ-road drive switch 89. The low-μ-road drive switch 89 is, however, not an essential element of the vehicle.

In the hybrid vehicles 20 and 20B of the first and the second embodiments described above, the low-speed hill drive control sets the low-μ-road correction rotation speed Nlow based on the difference between the actual slip ratio Sl and the target slip ratio Sl*. One possible modification may set a predetermined constant rotation speed to the low-μ-road correction rotation speed Nlow when the actual slip ratio Sl exceeds the target slip ratio Sl*. The low-speed hill drive control sets the target slip ratio Sl* based on both the longitudinal vehicle gradient θfr and horizontal vehicle gradient θrl. The target slip ratio Sl* may be based on only the longitudinal vehicle gradient θfr. In response to identification of the low-μ-road drive condition, the low-speed hill drive control refers to the curve for the low-μ-road drive condition in the brake-based correction rotation speed setting map to set the brake-based correction rotation speed Nb corresponding to the brake pressure Pb. The curve for the low-μ-road drive condition in the brake-based correction rotation speed setting map may not be used for setting the brake-based correction rotation speed Nb under the low-μ-road drive condition. When the target engine rotation speed Ne* is reduced in response to identification of the low-μ-road drive condition, the motor 40 is controlled to output a torque corresponding to the reduction. When the target engine rotation speed Ne* is reduced in response to identification of the low-μ-road drive condition, the motor 40 may be controlled to output a torque corresponding to the reduction multiplied by a predetermined factor or may be controlled to output a predetermined constant torque. Another possible modification may not control the motor 40 to output a torque corresponding to the reduction, even when the target engine rotation speed Ne* is reduced in response to identification of the low-μ-road drive condition.

In the hybrid vehicles 20 and 20B of the first and the second embodiments described above, the motor 40 is controlled to output a torque corresponding to the difference between the target engine rotation speed Ne* and the actual rotation speed Ne of the engine 22. The motor 40 may be controlled to output a torque corresponding to the difference between the target engine rotation speed Ne* and the actual rotation speed Ne of the engine 22 multiplied by a predetermined factor. Otherwise the motor 40 may not be controlled to output a torque corresponding to the difference between the target engine rotation speed Ne* and the actual rotation speed Ne of the engine 22.

In the hybrid vehicles 20 and 20B of the first and the second embodiments described above, the motor 40 is arranged to output power to the rear wheels 66a and 66b linked to the rear axle 67. The motor 40 may alternatively be arranged to output power to the front wheels 63a and 63b linked to the front axle 64.

The hybrid vehicles 20 and 20B of the first and the second embodiments have the motor 40 that outputs power to the rear wheels 66a and 66b linked to the rear axle 67. The technique of the invention may be applied to a vehicle of a modified configuration without the motor 40. The drive control in this modified configuration excludes the control of the motor 40 to output a torque corresponding to the difference between the target engine rotation speed Ne* and the actual rotation speed Ne of the engine 22 and the control of the motor 40 to output a torque corresponding to the reduction of the target engine rotation speed Ne* under the low-g-road drive condition.

The hybrid vehicles 20 and 20B of the first and the second embodiments have the continuous variable transmission CVT 50. The CVT 50 may be replaced by a toroidal or any other continuous variable transmission or even by a stepped transmission.

The embodiments described above regard the hybrid vehicles 20 and 20B. The technique of the invention is, however, not restricted to such hybrid vehicles but is also actualized by an automobile without a driving motor or by a control method of the hybrid vehicle or the automobile.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applied to automobile manufacturing industries.

The invention claimed is:

1. A motor vehicle, comprising:
an internal combustion engine that has an output shaft and is capable of outputting a driving force for driving said motor vehicle;
a driving force transmission mechanism that is linked to the output shaft of the internal combustion engine and to an axle and, in at least a predetermined low vehicle speed range, transmits a driving force corresponding to a rotation speed of the internal combustion engine to the axle;
a driving force demand detection unit that detects a driving force demand corresponding to a driver's operation;
a road gradient detection unit that detects a road gradient;
a vehicle speed measurement unit that measures a vehicle speed; and
a low-speed drive control module that, when the measured vehicle speed is not higher than a preset reference vehicle speed included in the predetermined low vehicle speed range and when the detected road gradient is not less than a preset reference gradient, sets a target rotation speed of the internal combustion engine corresponding to a driving force required for constant-speed driving on the detected road gradient at a target vehicle speed, which is set to be not higher than the preset reference vehicle speed, and sets a target throttle opening for driving the internal combustion engine at the set target rotation speed,
when a required throttle opening corresponding to the detected driving force demand is not less than the target throttle opening, said low-speed drive control module controlling operation of the internal combustion engine with the required throttle opening,
when the required throttle opening is less than the target throttle opening, said low-speed drive control module controlling the operation of the internal combustion engine with the target throttle opening.

2. A motor vehicle in accordance with claim 1, wherein said low-speed drive control module sets a vehicle speed difference-compensating rotation speed corresponding to a vehicle speed difference between the measured vehicle speed and the target vehicle speed, and sets the target rotation speed based on the vehicle speed difference-compensating rotation speed.

3. A motor vehicle in accordance with claim 2, wherein said low-speed drive control module sets the vehicle speed difference-compensating rotation speed to cancel out the vehicle speed difference.

4. A motor vehicle in accordance with claim 2, wherein said low-speed drive control module uses at least part of the detected driving force demand, the detected road gradient, and the measured vehicle speed to specify presence or absence of a bump on a road surface, and upon specification of the presence of a bump, sets the target rotation speed without using the vehicle speed difference-compensating rotation speed.

5. A motor vehicle in accordance with claim 4, wherein said low-speed drive control module specifies the presence of a bump, when the detected driving force demand is neither an acceleration demand nor a deceleration demand and when an absolute value of acceleration-deceleration, which is obtained by eliminating an effect of the detected road gradient from a vehicle acceleration, is not less than a preset reference value.

6. A motor vehicle in accordance with claim 4, wherein said low-speed drive control module specifies the presence of a bump, when the measured vehicle speed is practically equal to 0 and when a rotation speed of the internal combustion engine is not lower than a preset reference rotation speed.

7. A motor vehicle in accordance with claim 1, wherein when the detected driving force demand is a brake demand, said low-speed drive control module sets a brake-based correction rotation speed corresponding to the brake demand, and sets the target rotation speed based on the brake-based correction rotation speed.

8. A motor vehicle in accordance with claim 7, wherein said low-speed drive control module sets the brake-based correction rotation speed to increase a reduction degree of the target rotation speed with an increase in level of the brake demand.

9. A motor vehicle in accordance with claim 7, wherein said low-speed drive control module identifies a vehicle-start condition to start said motor vehicle in a stop state, based on the detected driving force demand and the measured vehicle speed,
   upon no identification of the vehicle-start condition, said low-speed drive control module setting the brake-based correction rotation speed according to a first relation against the brake demand,
   upon identification of the vehicle-start condition, said low-speed drive control module setting the brake-based correction rotation speed according to a second relation, which sets a lower rotation speed against the brake demand than a rotation speed set in the first relation.

10. A motor vehicle in accordance with claim 9, wherein said low-speed drive control module identifies the vehicle-start condition when the measured vehicle speed is practically equal to 0 and when the detected driving force demand is a brake demand of not less than a preset reference brake demand,
   when the measured vehicle speed reaches the preset reference vehicle speed after identification of the vehicle-start condition, said low-speed drive control module canceling the identification of the vehicle-start condition.

11. A motor vehicle in accordance with claim 9, wherein said low-speed drive control module identifies a low friction-road drive condition where a friction coefficient of a road surface is not higher than a predetermined level, based on a specific identification condition,
   upon identification of the low friction-road drive condition, said low-speed drive control module setting the brake-based correction rotation speed according to a third relation, which sets a lower rotation speed against a certain brake demand than a rotation speed set in the second relation.

12. A motor vehicle in accordance with claim 1, wherein said low-speed drive control module identifies a low friction-road drive condition where a friction coefficient of a road surface is not higher than a predetermined level, based on a specific identification condition,
   upon identification of the low friction-road drive condition, said low-speed drive control module making a correction to decrease the target rotation speed.

13. A motor vehicle in accordance with claim 12, said motor vehicle further comprising:
   a low friction-road drive condition setting unit that sets the low friction-road drive condition in response to the driver's operation,
   wherein said low-speed drive control module identifies the low friction-road drive condition, based on the setting of the low friction-road drive condition by the low friction-road drive condition setting unit as the specific identification condition.

14. A motor vehicle in accordance with claim 12, said motor vehicle further comprising:
   a wheel speed measurement unit that measures a wheel speed,
   wherein said low-speed drive control module computes a slip ratio from the measured wheel speed and identifies the low friction-road drive condition based on the computed slip ratio.

15. A motor vehicle in accordance with claim 14, wherein said low-speed drive control module identifies the low friction-road drive condition when the computed slip ratio is greater than a preset target slip ratio.

16. A motor vehicle in accordance with claim 15, wherein said low-speed drive control module sets the target slip ratio to decrease with an increase in detected road gradient and uses the target slip ratio for identification of the low friction-road drive condition.

17. A motor vehicle in accordance with claim 15, said motor vehicle further comprising:
   a lateral gradient detection unit that detects a lateral gradient of said motor vehicle,
   wherein said low-speed drive control module sets the target slip ratio to decrease with an increase in detected lateral gradient and uses the target slip ratio for identification of the low friction-road drive condition.

18. A motor vehicle in accordance with claim 15, wherein said low-speed drive control module sets a slip-adjustment rotation speed, which gives a greater degree of reduction as a correction of the target rotation speed with an increase in computed slip ratio over the target slip ratio, and sets the target rotation speed based on the slip-adjustment rotation speed.

19. A motor vehicle in accordance with claim 12, said motor vehicle further comprising:
   a motor that is capable of outputting a driving force to a different axle other than one axle that receives the driving force output from the internal combustion engine,
   wherein when the target rotation speed is adjusted to have a reduction, said low-speed drive control module controls the motor to output a driving force corresponding to the reduction.

20. A motor vehicle in accordance with claim 1, said motor vehicle further comprising:
- a motor that is capable of outputting a driving force to one axle that receives the driving force output from the internal combustion engine or a different axle other than the one axle; and
- a rotation speed measurement unit that measures a rotation speed of the internal combustion engine,
- wherein when the internal combustion engine is driven with at least the target throttle opening, said low-speed drive control module controls the motor to output a driving force corresponding to a rotation speed difference between the target rotation speed and the measured rotation speed.

21. A motor vehicle in accordance with claim 20, wherein when the internal combustion engine is driven with the required throttle opening, said low-speed drive control module controls the motor to output a driving force corresponding to a rotation speed difference between the measured rotation speed and an expected rotation speed in a stationary operation of the internal combustion engine with the required throttle opening.

22. A motor vehicle in accordance with claim 1, said motor vehicle further comprising:
- a running direction setting unit that sets a running direction of said motor vehicle in response to the driver's operation,
- wherein when the running direction set by the running direction setting unit is a forward direction, said low-speed drive control module sets the target rotation speed according to a first relation against the road gradient,
- when the running direction set by the running direction setting unit is a reverse direction, said low-speed drive control module setting the target rotation speed according to a second relation, which sets a lower rotation speed against the road gradient than a rotation speed set in the first relation.

23. A motor vehicle in accordance with claim 22, said motor vehicle further comprising:
- a target vehicle speed setting unit that sets a first vehicle speed to the target vehicle speed when the running direction set by the running direction setting unit is a forward direction, and sets a second vehicle speed, which is lower than the first vehicle speed, to the target vehicle speed when the running direction set by the running direction setting unit is a reverse direction.

24. A control method of a motor vehicle, said motor vehicle comprising: outputting a driving force for driving said motor vehicle; a driving force transmitting corresponding to a rotation speed of the internal combustion engine to the axle,
- said control method controlling said motor vehicle when a measured vehicle speed is not higher than a preset reference vehicle speed included in the predetermined low vehicle speed range and when a detected road gradient is not less than a preset reference gradient,
- said control method comprising the steps of:
- (a) setting a target rotation speed of the internal combustion engine corresponding to a driving force required for on the detected road gradient constant-speed driving of said motor vehicle at a target vehicle speed, which is set to be not higher than the preset reference vehicle speed;
- (b) setting a target throttle opening for driving the internal combustion engine at the set target rotation speed; and
- (c) when a required throttle opening corresponding to a driving force demand in response to a driver's operation is not less than the target throttle opening, controlling operation of the internal combustion engine with the required throttle opening,
- when the required throttle opening is less than the target throttle opening, controlling the operation of the internal combustion engine with the target throttle opening.

* * * * *